United States Patent
Yoshida

(10) Patent No.: US 11,775,789 B2
(45) Date of Patent: Oct. 3, 2023

(54) IMAGE FORMING APPARATUS

(71) Applicant: CANON KABUSHIKI KAISHA, Tokyo (JP)

(72) Inventor: Hidefumi Yoshida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/848,480

(22) Filed: Jun. 24, 2022

(65) Prior Publication Data

US 2023/0050444 A1 Feb. 16, 2023

(30) Foreign Application Priority Data

Aug. 10, 2021 (JP) .............................. JP2021-130575

(51) Int. Cl.
*G06K 15/12* (2006.01)
*G03G 15/04* (2006.01)
*G03G 15/043* (2006.01)

(52) U.S. Cl.
CPC ....... *G06K 15/1247* (2013.01); *G03G 15/043* (2013.01); *G03G 15/04054* (2013.01)

(58) Field of Classification Search
CPC ........... G03G 15/04054; G03G 15/043; G06K 15/1247
See application file for complete search history.

(56) References Cited

U.S. PATENT DOCUMENTS

| | | | | |
|---|---|---|---|---|
| 6,184,971 B1* | 2/2001 | Narita | .................... | G03B 27/54 355/35 |
| 2014/0253657 A1* | 9/2014 | Tatebe | .................... | G03G 13/04 347/130 |
| 2014/0267527 A1* | 9/2014 | Masuda | ........... | G03G 15/04054 347/133 |
| 2018/0314184 A1* | 11/2018 | Watanabe | .......... | G03G 15/5004 |
| 2022/0203705 A1* | 6/2022 | Tanimoto | ................. | B41J 2/447 |

FOREIGN PATENT DOCUMENTS

JP 2016-124264 A 7/2016

* cited by examiner

*Primary Examiner* — Carla J Therrien
(74) *Attorney, Agent, or Firm* — Venable LLP

(57) ABSTRACT

An image forming apparatus includes an exposure device configured to perform multiple exposure with a second light-emitting element array of a place exposed with a first light-emitting element array; and a controller configured to transmit a signal for controlling the exposure device. The exposure device sets a first pulse signal for light emission of the first light-emitting element array based on a first delay time and a first pulse width, sets a second pulse signal for light emission of the second light-emitting element array based on a second delay time, different from the first delay time, and a second pulse width, identical to the first pulse width, and starts and terminates light emission of each of the first light-emitting element array and the second light-emitting element array according to the set first pulse signal and second pulse signal.

6 Claims, 22 Drawing Sheets

| TARGET CIRCUIT | SET VALUE OF DELAY TIME a | SET VALUE OF PULSE WIDTH b | a+b |
|---|---|---|---|
| 805-0 | 10 | 400 | 410 |
| 805-1 | 20 | 400 | 420 |
| 805-2 | 30 | 400 | 430 |
| 805-3 | 40 | 400 | 440 |
| 805-4 | 50 | 400 | 450 |
| 805-5 | 60 | 400 | 460 |

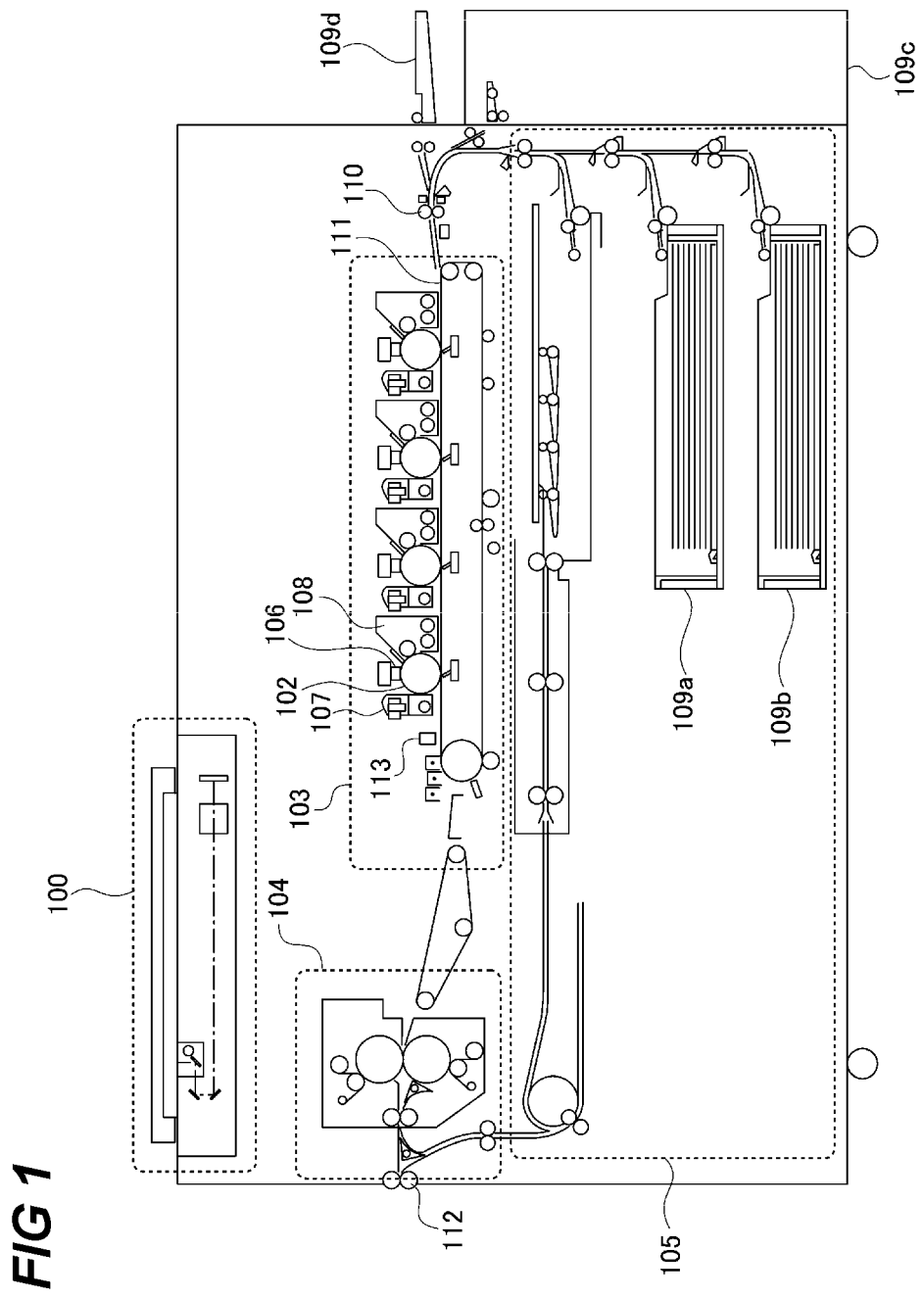

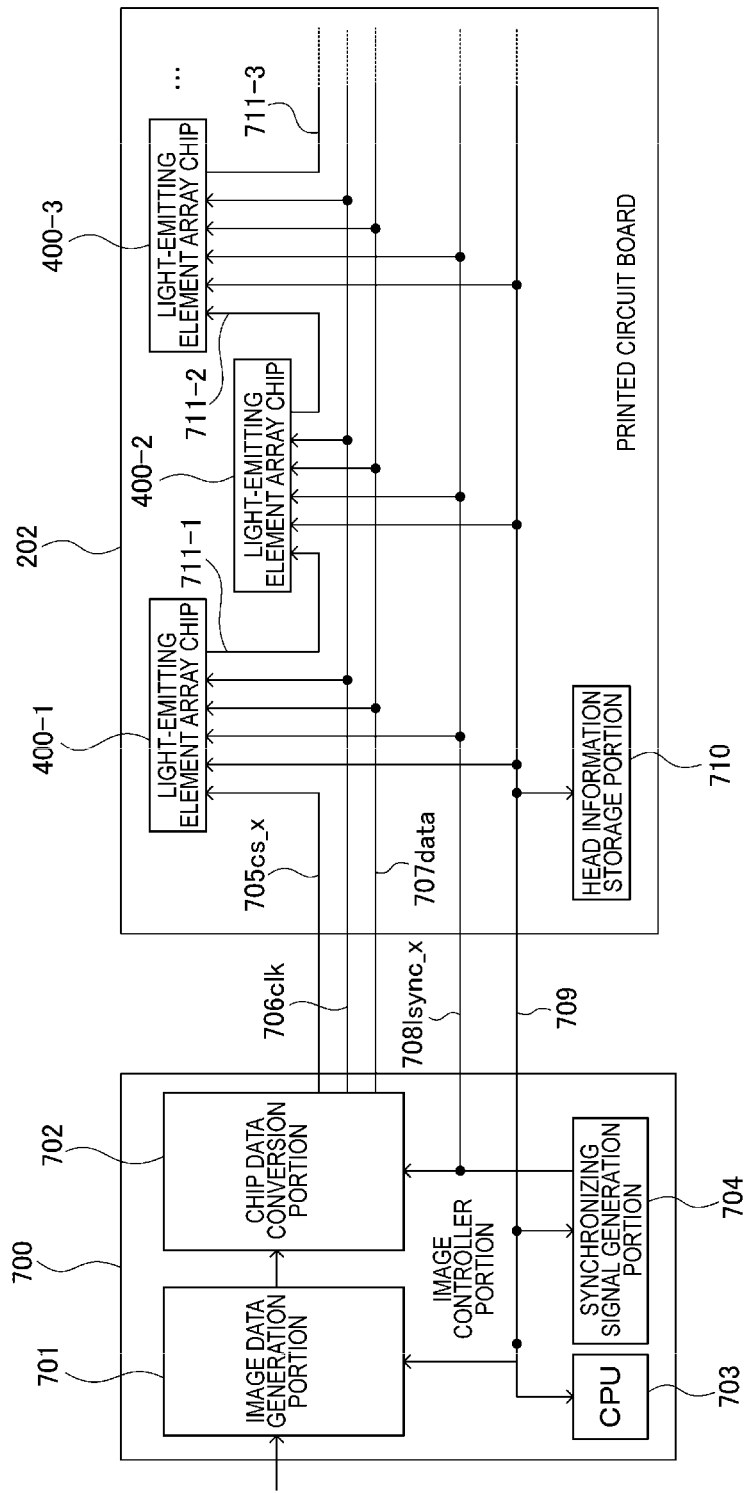

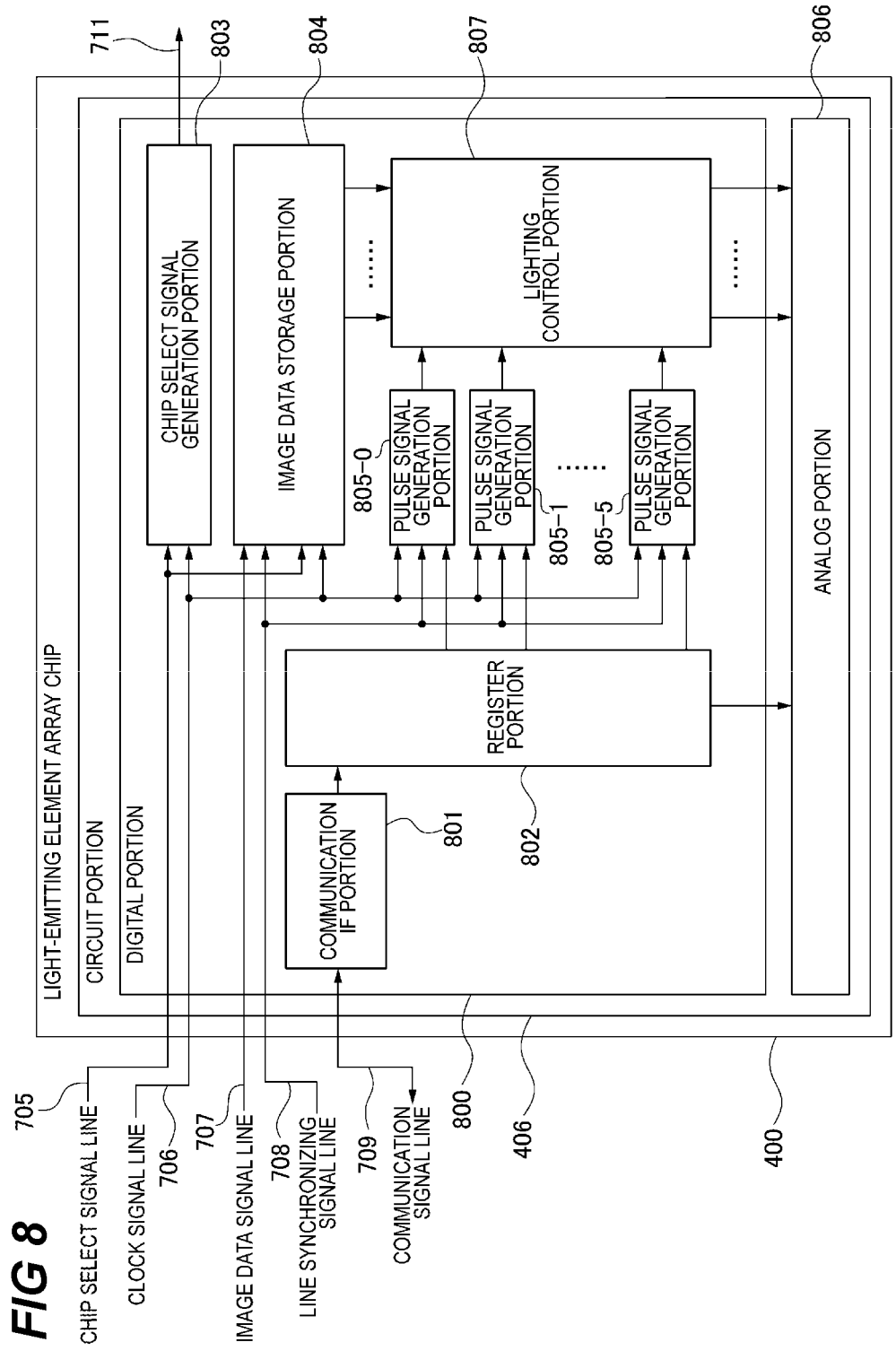

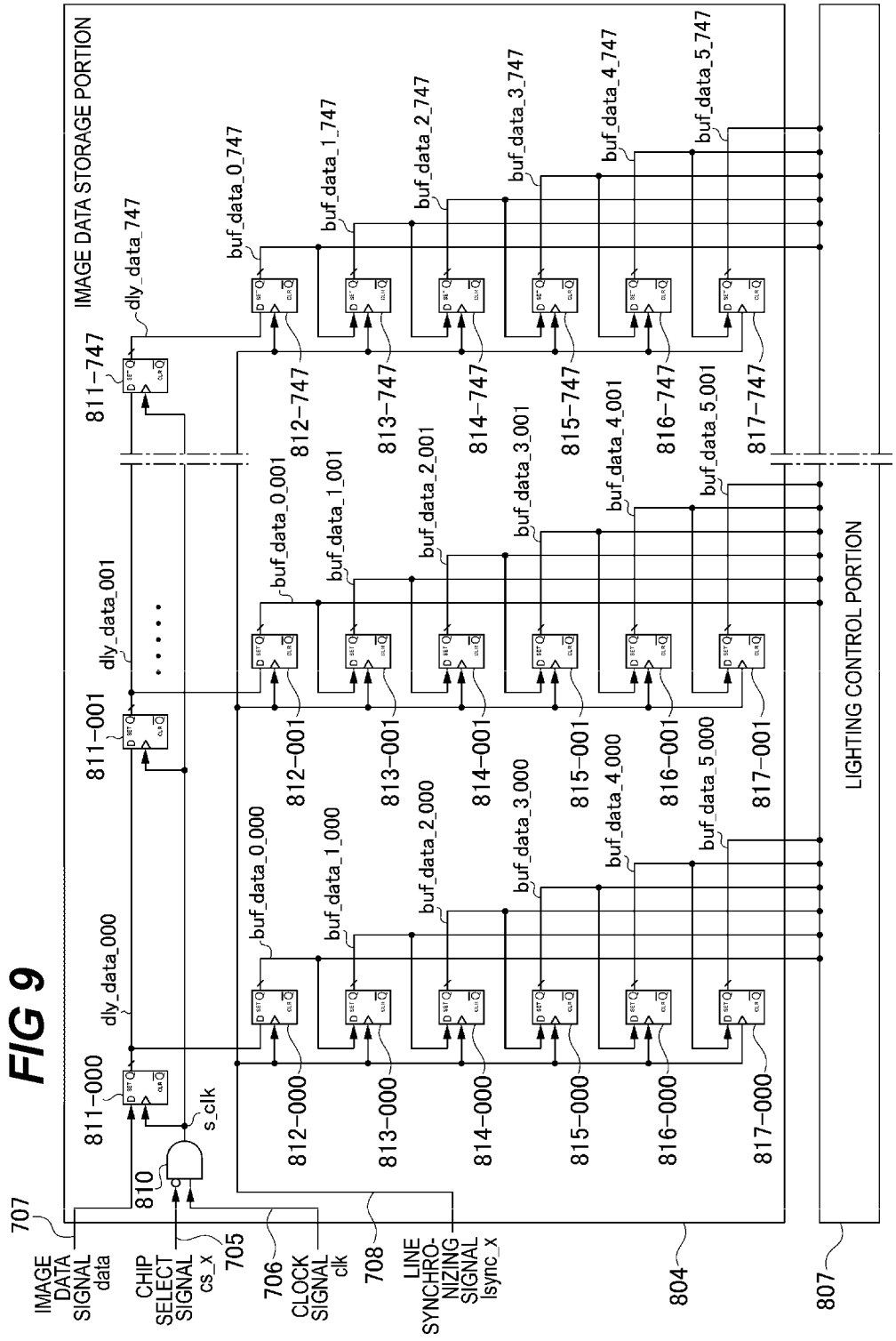

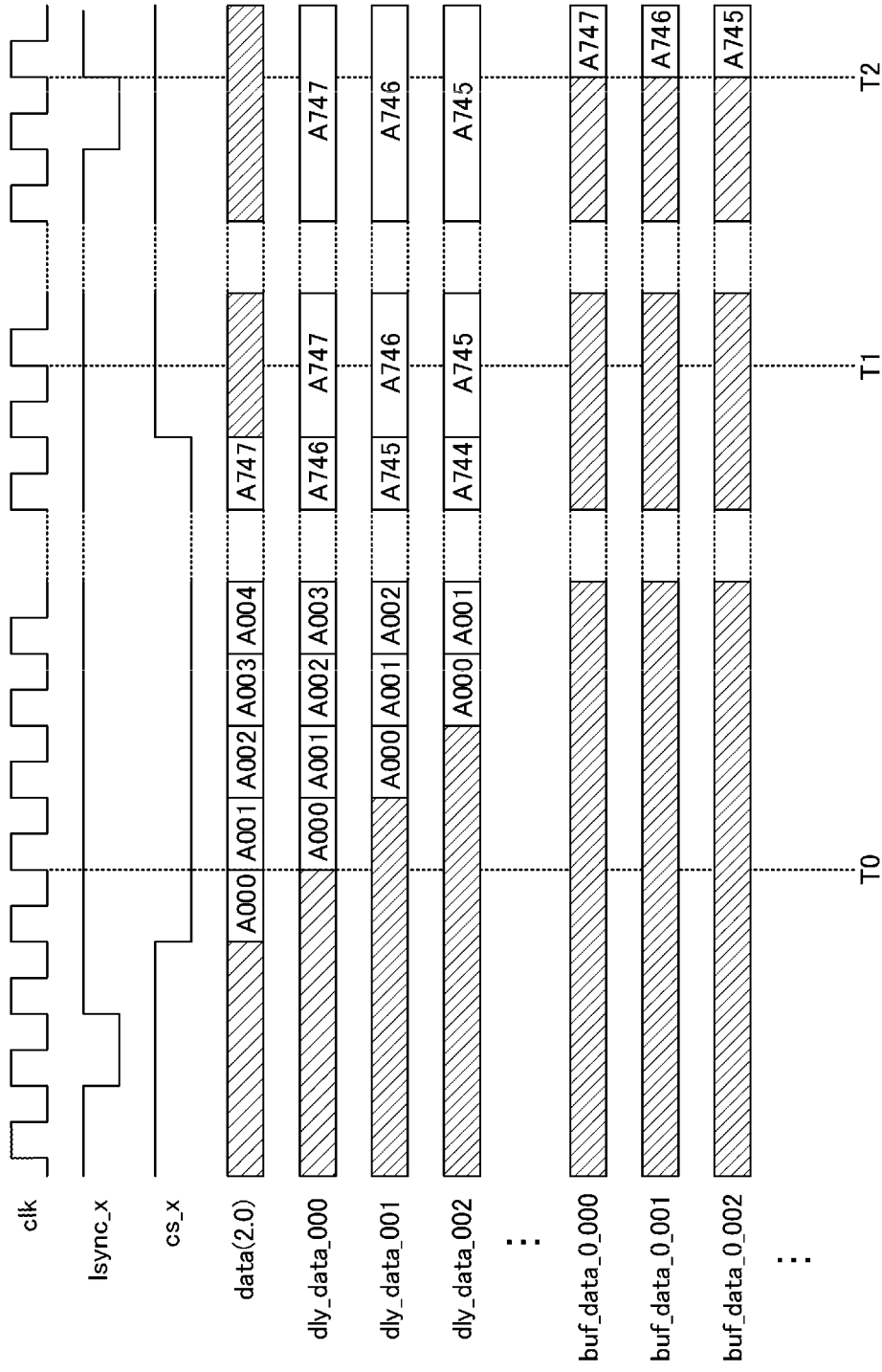

FIG 15

| TARGET CIRCUIT | SET VALUE OF DELAY TIME a | SET VALUE OF PULSE WIDTH b | a+b |
|---|---|---|---|
| 805-0 | 10 | 400 | 410 |
| 805-1 | 20 | 400 | 420 |
| 805-2 | 30 | 400 | 430 |
| 805-3 | 40 | 400 | 440 |
| 805-4 | 50 | 400 | 450 |
| 805-5 | 60 | 400 | 460 |

| TARGET CIRCUIT | SET VALUE OF DELAY TIME SELECTION s | SET VALUE OF PULSE WIDTH b |
|---|---|---|
| 1405-0 | 0 | 400 |
| 1405-1 | 1 | 400 |
| 1405-2 | 1 | 400 |
| 1405-3 | 1 | 400 |
| 1405-4 | 1 | 400 |
| 1405-5 | 1 | 400 |

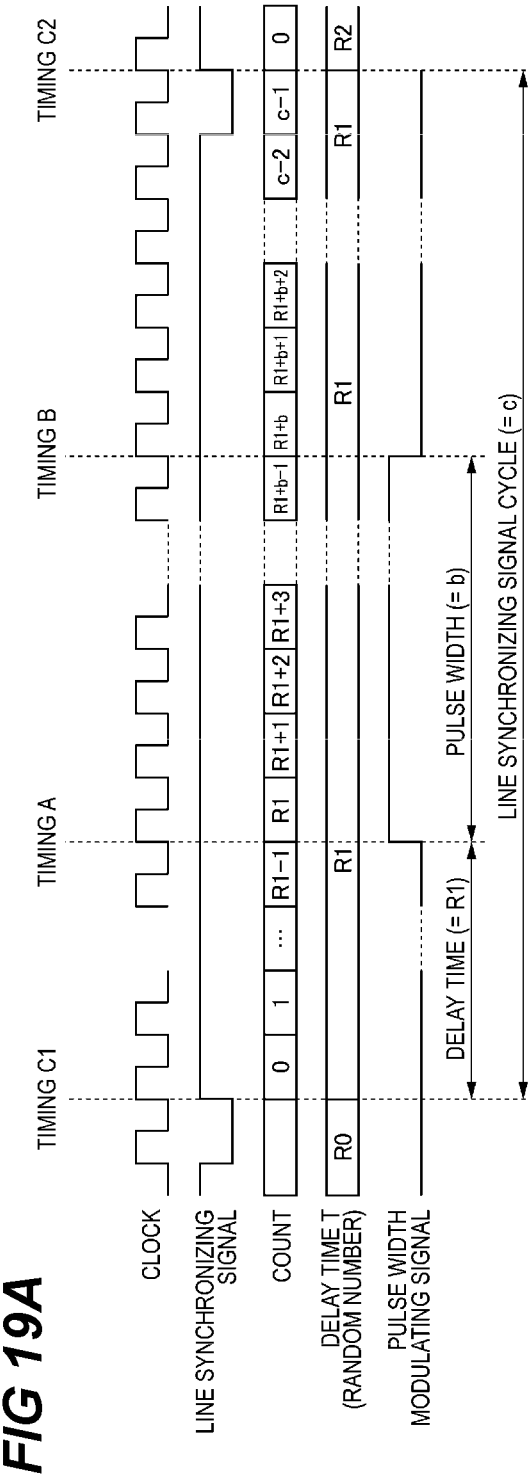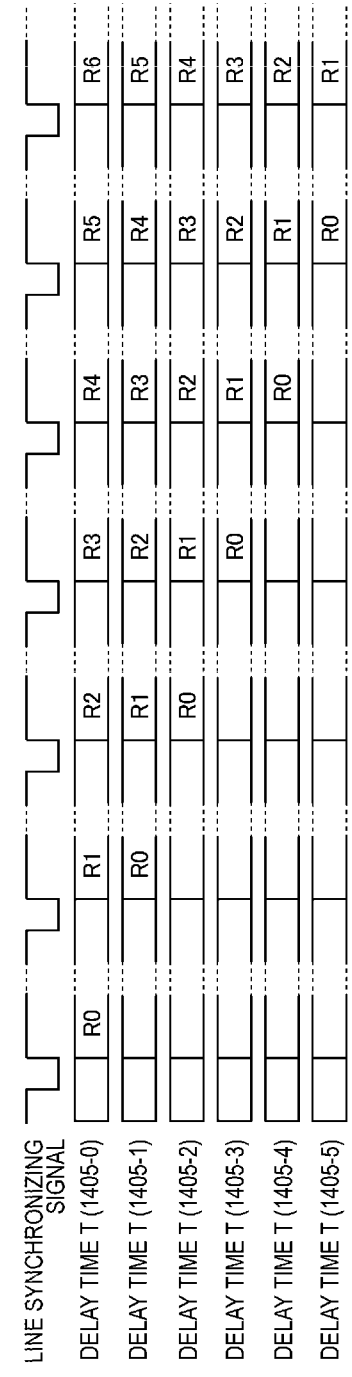
FIG. 19A
FIG. 19B

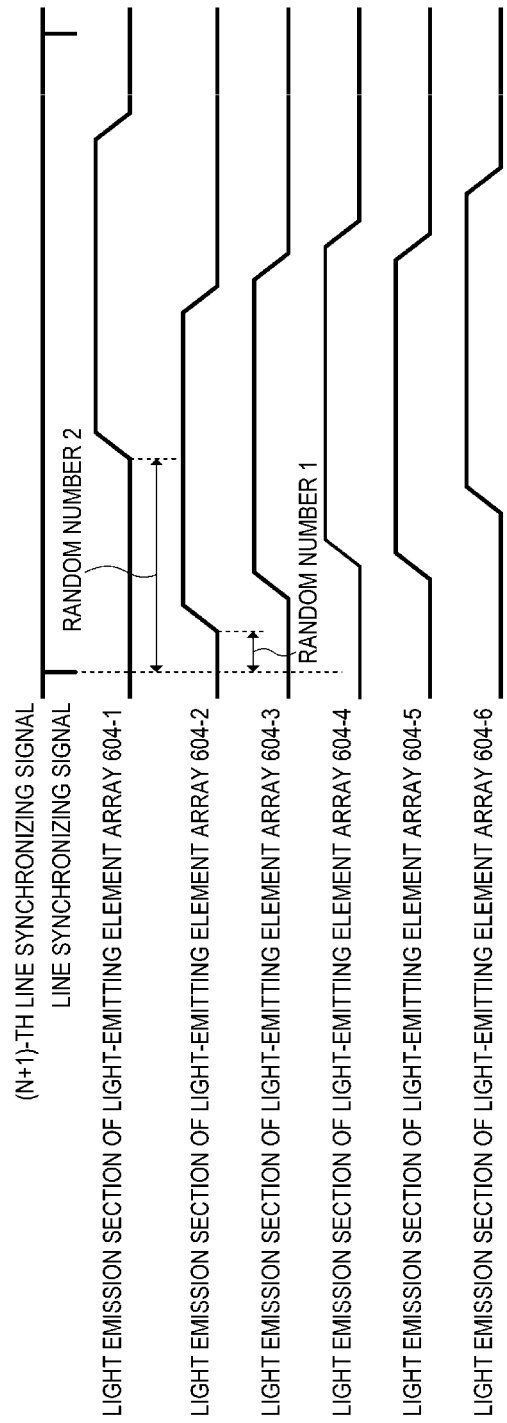

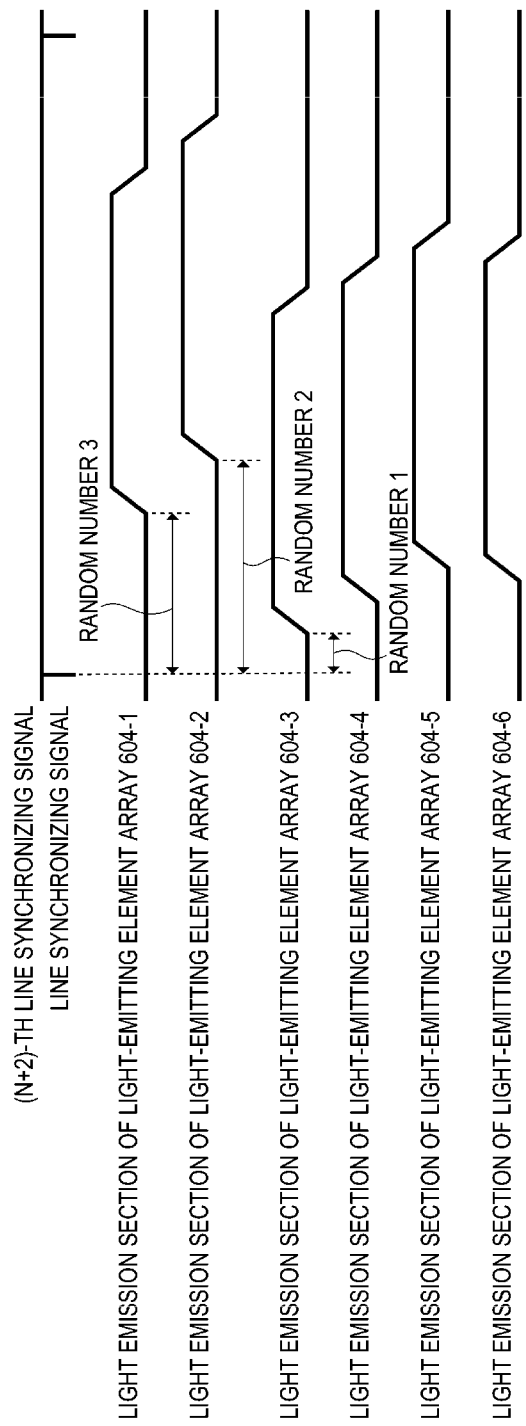

IMAGE FORMING APPARATUS

BACKGROUND OF THE INVENTION

Field of the Invention

The present invention relates to an image forming apparatus including an exposure device that exposes a photoconductor.

Description of the Related Art

A publicly known electrophotographic image forming apparatus, such as a printer, includes an exposure device that includes LEDs or organic EL elements and exposes a photoconductive drum to form a latent image. The exposure device includes a light-emitting element array disposed in the rotational axis direction (longitudinal direction) of the photoconductive drum and a rod lens array that forms an image on the photoconductive drum with light from the light-emitting element array. It has been known that the LEDs or organic EL elements are of a surface-emission type, in which the irradiation direction of light from the light-emitting face is identical to the direction of the rod lens array.

Here, the length in the longitudinal direction of the light-emitting element array is determined according to the width of an image region on the photoconductive drum, and the pitch between light-emitting elements is determined according to the resolution of the printer. For example, a printer at 1200 dpi has a pitch of 21.16 μm between pixels (omission of the third and subsequent decimal places), and thus the pitch between light-emitting elements is 21.16 μm. A printer including such an exposure device has fewer components in use than that of a printer of a laser scanning type in which a laser beam deflection-scans due to a polygon motor, leading to facilitation of a reduction in the size of an apparatus and a reduction in cost.

An organic EL element is lower in the intensity of light emission than that of a laser or LED. Thus, a plurality of light-emitting element arrays each including a plurality of light-emitting elements disposed in the longitudinal direction of a photoconductive drum is disposed in the rotational direction orthogonal to the longitudinal direction of the photoconductive drum. Multiple exposure to or of the same place on the photoconductive drum with the plurality of light-emitting element arrays secures necessary light quantity. For example, according to Japanese Patent Application Laid-Open No. 2016-124264, light-emitting spots are arrayed two-dimensionally and the arrangement of the light-emitting spots is characterized for multiple exposure. Such a configuration enables formation of a latent image on a photoconductive drum even with organic EL elements low in light quantity.

However, in a printer that performs multiple exposure, a plurality of light-emitting elements disposed in the longitudinal direction of a photoconductive drum and in the direction orthogonal to the longitudinal direction lights up at a time in synchronization with a line synchronizing signal. Because signals for lighting of the plurality of light-emitting elements change at a time, the number of signals that change simultaneously is large, leading to large switching noise as a problem.

SUMMARY OF THE INVENTION

According to a representative configuration of the present invention, an image forming apparatus includes a photoconductor; an exposure device including a chip having a first light-emitting element array and a second light-emitting element array, the first light-emitting element array including a plurality of light-emitting elements disposed in a first direction that is a rotational axis direction of the photoconductor, the second light-emitting element array including a plurality of light-emitting elements disposed in the first direction, the first light-emitting element array and the second light-emitting element array being disposed in sequence in a second direction orthogonal to the first direction, the exposure device being configured to perform multiple exposure with the second light-emitting element array to an exposure position exposed with the first light-emitting element array on the photoconductor; and a controller configured to transmit, to the exposure device, a signal for controlling the exposure device, in which the exposure device sets a first pulse signal for light emission of the first light-emitting element array, based on a first delay time from an input timing of a line synchronizing signal to a first start timing at which light emission starts and a first pulse width from the first start timing to a first termination timing at which the light emission terminates before a next input timing of the line synchronizing signal, sets a second pulse signal for light emission of the second light-emitting element array, based on a second delay time, different from the first delay time, from an input timing of the line synchronizing signal to a second start timing at which light emission starts and a second pulse width, identical to the first pulse width, from the second start timing to a second termination timing at which the light emission terminates before a next input timing of the line synchronizing signal, and starts and terminates light emission of each of the first light-emitting element array and the second light-emitting element array, according to the set first pulse signal and second pulse signal.

Further features of the present invention will become apparent from the following description of exemplary embodiments with reference to the attached drawings.

BRIEF DESCRIPTION OF THE DRAWINGS

FIG. 1 is a schematic sectional view of the entire configuration of an image forming apparatus;

FIG. 7 is a block diagram of an image controller portion and the printed circuit board;

FIG. 8 is a circuit block diagram in a light-emitting element array chip according to a first embodiment;

FIG. 9 is a block diagram of an image data storage portion;

FIG. 10 is a timing chart of the operation of the image data storage portion;

FIG. 15 is a table of set values to be set in pulse signal generation portions according to the first embodiment;

FIG. 19A is a timing chart of a pulse signal generation portion according to the second embodiment, and FIG. 19B is a timing chart of pulse signal generation portions according to the second embodiment; and FIGS. 20A, 20B, and 20C are explanatory timing charts of sections of light emission of light-emitting element arrays in a chip according to the second embodiment.

DESCRIPTION OF THE EMBODIMENTS

Figure 2A:
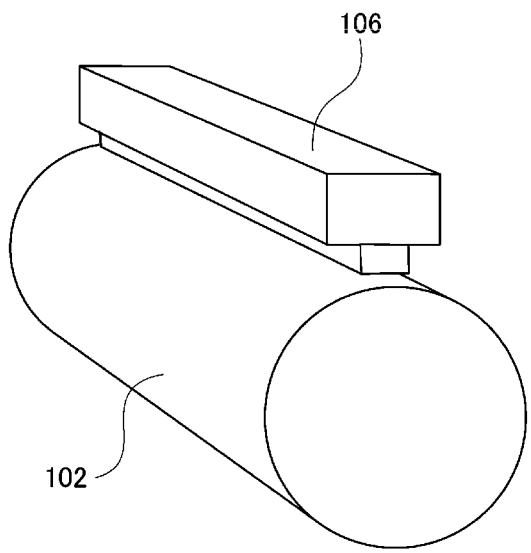
FIGS. 2A and 2B illustrate the positional relationship between an exposure head and a photoconductive drum.

Exemplary embodiments of the present invention will be exemplarily described in detail below with reference to the drawings. Note that the dimensions, material, and shape of each of the constituent components and the relative arrangement thereof in the following embodiments should be appropriately changed according to the configuration of an apparatus to which the present invention is applied or various types of conditions, and thus should not be construed to limit the scope of the present invention.

First Embodiment (Entire Configuration of Image Forming Apparatus)

An electrophotographic image forming apparatus according to the present embodiment will be described simply. FIG. 1 illustrates the entire configuration of the image forming apparatus. The image forming apparatus includes a scanner portion 100, an image forming portion 103, a fixing portion 104, a feeding/conveying portion 105, and a printer control portion (not illustrated) that controls the proceeding portions.

The scanner portion 100 illuminates, with light, an original placed on its original base plate, optically reads an original image, and then converts the image into an electric signal to create image data. In the image forming portion 103, a photoconductive drum 102 as an image bearing member (photoconductor) is driven to rotate, and a charging device 107 charges the photoconductive drum 102. An exposure head 106 as an exposure device emits light according to the image data, and focuses, onto the photoconductive drum 102, the light emitted from the chip face of a light-emitting element cluster to form an electrostatic latent image. A development device 108 develops, with toner, the electrostatic latent image formed on the photoconductive drum 102. The developed toner image is transferred onto a sheet conveyed on a transfer belt 111. The image forming portion includes four image forming units for cyan (C), magenta (M), yellow (Y), and black (K), in this order, disposed in tandem, in which the four image forming units each carry out such a flow of electrophotographic process (charging, exposing, developing, and transferring) as above, for formation of a full-color image. When a predetermined time passes after the start of image forming of the image forming unit for cyan of the four image forming units in tandem, the image forming unit for magenta, the image forming unit for yellow, and the image forming unit for black operate, in sequence, for image forming.

The feeding/conveying portion 105 feeds a sheet as a recording medium from a previously designated feeding unit from among internal feeding units 109a and 109b, an external feeding unit 109c, and a manual feeding unit 109d, so that the fed sheet is conveyed to a registration roller 110. The registration roller 110 conveys the sheet onto the transfer belt 111 such that each toner image formed in the image forming portion 103 is transferred to the sheet. An optical sensor 113 is disposed facing the transfer belt 111 and detects the position of a test chart printed on the transfer belt 111 in order to derive a color deviation quantity between each image forming unit. An image controller portion 700 (refer to FIG. 7) is notified of the derived color deviation quantity to correct the position of an image in each color. Due to such control, a full-color toner image with no color deviation is transferred to the sheet. The fixing portion 104 includes rollers in combination and has a heat source, such as a halogen heater, built therein. The fixing portion 104 fuses and fixes, by heat and pressure, the toner on the sheet having the toner image transferred thereto, from the transfer belt 111. The sheet having the image fixed thereto is discharged outward from the image forming apparatus by a discharge roller 112.

In communication with an MFP control portion that controls the entire MFP, the printer control portion (not illustrated) performs control according to an instruction therefrom. In addition, while managing the respective states of the scanner portion 100, the image forming portion 103, the fixing portion 104, and the feeding/conveying portion 105 described above, the printer control portion gives instructions such that the entirety can operate smoothly in balance. Note that the MFP is an abbreviation for multifunction printer and the entire MFP indicates the entire image forming apparatus. Herein, the image forming apparatus is provided as a multifunction printer having the functions of printing, copying, image reading, and faxing, collectively, but this is not limiting.

(Configuration of Exposure Head)

Figure 2B:
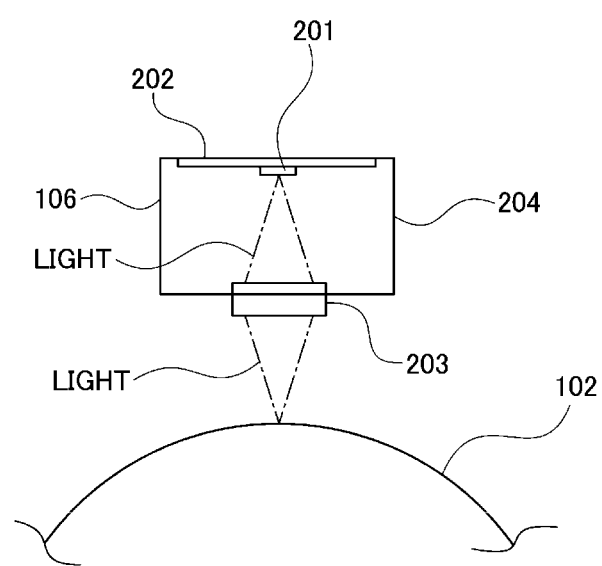

An exposure head 106 as an exposure device that exposes a photoconductive drum 102 will be described with reference to FIGS. 2A and 2B. FIGS. 2A and 2B illustrate, respectively, the state of arrangement of the exposure head 106 relative to the photoconductive drum 102 and a state where light emitted from a light-emitting element cluster 201 is focused on the photoconductive drum 102 by a rod lens array 203.

The exposure head 106 and the photoconductive drum 102 are each attached to the image forming apparatus by attaching members (not illustrated). The exposure head 106 includes the light-emitting element cluster 201, a printed circuit board 202 on which the light-emitting element cluster 201 is mounted, the rod lens array 203, and a housing 204 to which the rod lens array 203 and the printed circuit board 202 are attached. In a factory, the exposure head 106 is fabricated and adjusted as a single item, and focus adjustment for adjusting a spot at the focal position to have a predetermined size and light quantity adjustment are made. Here, arrangement is made such that the distance between the photoconductive drum 102 and the rod lens array 203 and the distance between the rod lens array 203 and the light-emitting element cluster 201 are each a predetermined interval, so that emitted light from the light-emitting element cluster 201 forms an image on the photoconductive drum 102. Thus, at the time of focus adjustment, the attachment position of the rod lens array 203 is adjusted such that the distance between the rod lens array 203 and the light-emitting element cluster 201 has a desired value. At the time of light quantity adjustment, the light-emitting elements are caused to emit light individually in sequence and a drive current for each light-emitting element is adjusted such that the light focused through the rod lens array 203 has a predetermined light quantity.

(Configuration of Circuit Board)

Figure 3A:
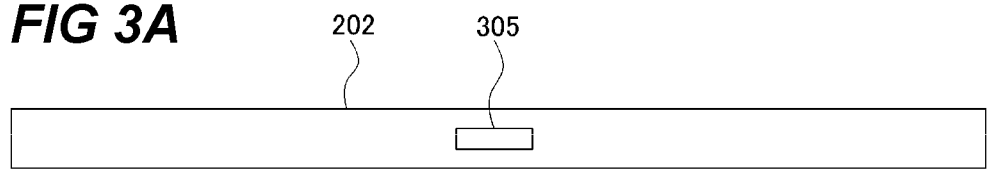
FIGS. 3A, 3B, and 3C are explanatory views of a printed circuit board.
Figure 3B:
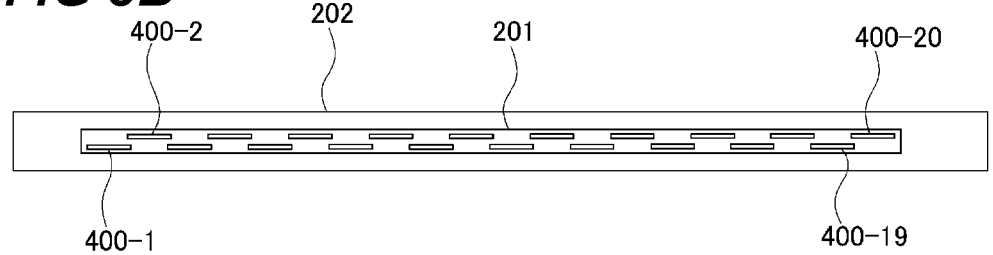

FIGS. 3A and 3B illustrate the printed circuit board 202 on which the light-emitting element cluster 201 is disposed. FIG. 3A illustrates the opposite face to the face on which the light-emitting element cluster 201 is mounted (hereinafter, referred to as a light-emitting element non-mounting face). FIG. 3B illustrates the face on which the light-emitting element cluster 201 is mounted (hereinafter, referred to as a light-emitting element mounting face). The printed circuit board 202 enables components to be mounted on both of the non-mounting face illustrated in FIG. 3A and the mounting face illustrated in FIG. 3B.

Figure 3C:
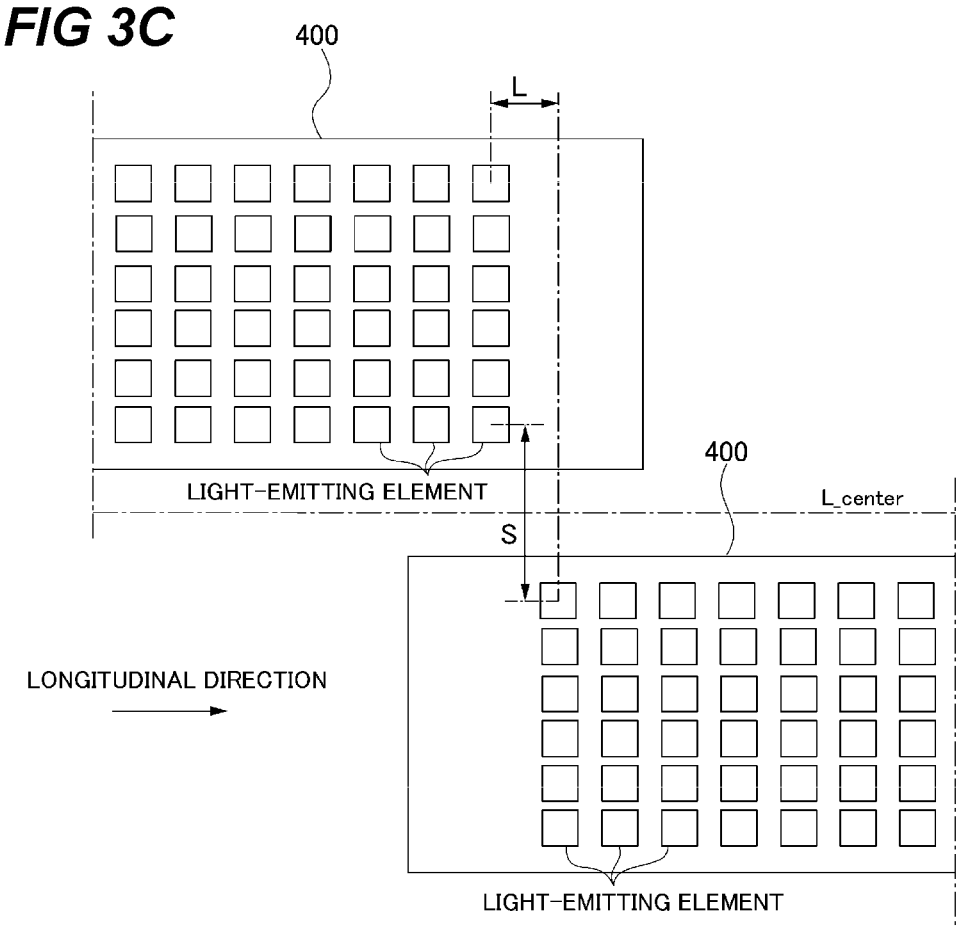

As illustrated in FIG. 3B, the light-emitting element cluster 201 including a plurality of light-emitting elements is mounted on the light-emitting element mounting face of the printed circuit board 202. The light-emitting element cluster 201 includes 20 light-emitting element array chips 400-1 to 400-20 arrayed in a staggered pattern. Each light-emitting element array chip includes 4488 light-emitting elements arrayed at predetermined resolution pitches in 748 columns in the longitudinal direction as a first direction of the chip and in six rows in the lateral direction as a second direction orthogonal to the first direction. In the present embodiment, in both of the longitudinal direction and lateral direction of the chip, the pitch between each adjacent light-emitting element is equivalent to a pitch of 1200 dpi in resolution (approximately 21.16 µm), and the length from one end to the other end of 748 light-emitting elements in the longitudinal direction of the chip is approximately 15.8 mm. Since the light-emitting element cluster 201 includes the 20 arrayed chips, the number of light-emitting elements enabling exposure in the longitudinal direction of the photoconductive drum 102 is 14960, enabling image forming corresponding to an image width of approximately 316 mm. The light-emitting element array chips 400-1 to 400-20 are disposed in two rows in a staggered pattern, and each row is disposed in the longitudinal direction of the printed circuit board 202. FIG. 3C illustrates the state of an inter-chip boundary portion of each light-emitting element array chip 400. In the inter-chip boundary portion, the pitch between light-emitting elements in the longitudinal direction is equivalent to a pitch of 1200 dpi in resolution (approximately 21.16 µm). Arrangement is made such that the pitch between the light-emitting elements mutually closest in the lateral direction between the chips in two rows (S in the figure) is approximately 105 µm (five pixels at 1200 dpi).

The pitch between light-emitting elements in the longitudinal direction of the exposure head 106 (L in the figure) between the chips in two rows is approximately 21.16 µm (one pixel at 1200 dpi). Note that, in the present embodiment, the pitches S and L between light-emitting element array chips do not necessarily have the respective values described above.

As illustrated in FIG. 3A, on the light-emitting element non-mounting face of the printed circuit board 202, disposed is a connector 305 for a control signal for controlling the light-emitting element array chips from the image controller portion 700 (refer to FIG. 7) and for connection of a power-supply line. Each light-emitting element array chip 400 is driven through the connector 305.

(Configuration of Light-Emitting Element Array Chip)

Figure 4:
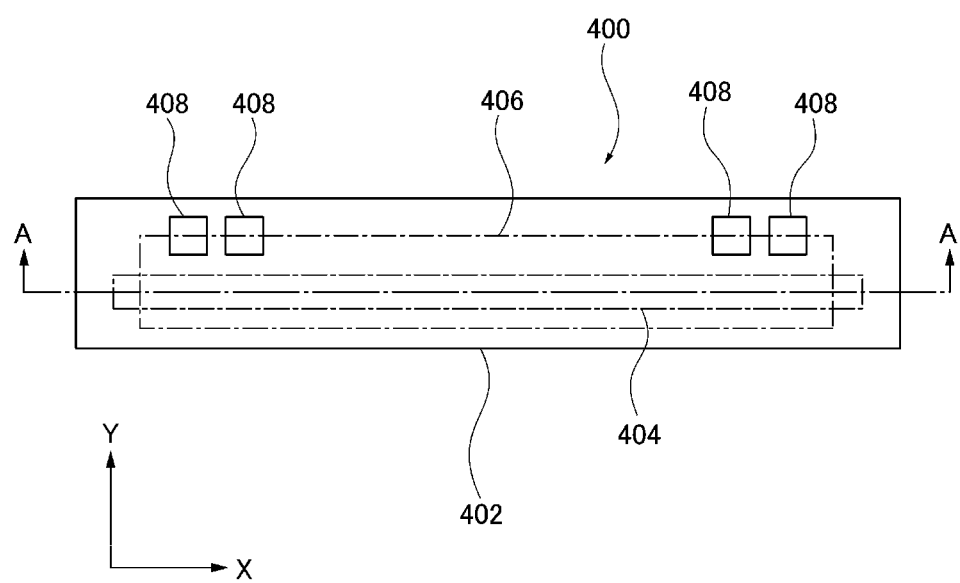
FIG. 4 is an explanatory view of the configuration of a light-emitting element array chip.

FIG. 4 illustrates a schematic plan configuration of a light-emitting element array chip 400. Note that the X direction in the figure corresponds to the rotational axis direction (longitudinal direction) of the photoconductive drum 102 and the first direction of the chip. The Y direction corresponds to the rotational direction of the photoconductive drum 102 and the second direction orthogonal to the first direction of the chip. The light-emitting element array chip 400 has, on a light-emitting substrate 402, a light-emitting portion 404 including a plurality of light-emitting elements and wire-bonding pads (WB pads) 408. Note that the light-emitting substrate 402 has a circuit portion 406 for controlling the light-emitting portion 404, built therein. The circuit portion 406 includes both an analog drive circuit and a digital control circuit. Power supply to the circuit portion 406 and input/output of signals from outside the light-emitting element array chip 400 are performed through the wire-bonding pads 408.

(Configuration of Light-Emitting Portion)

Figure 5:
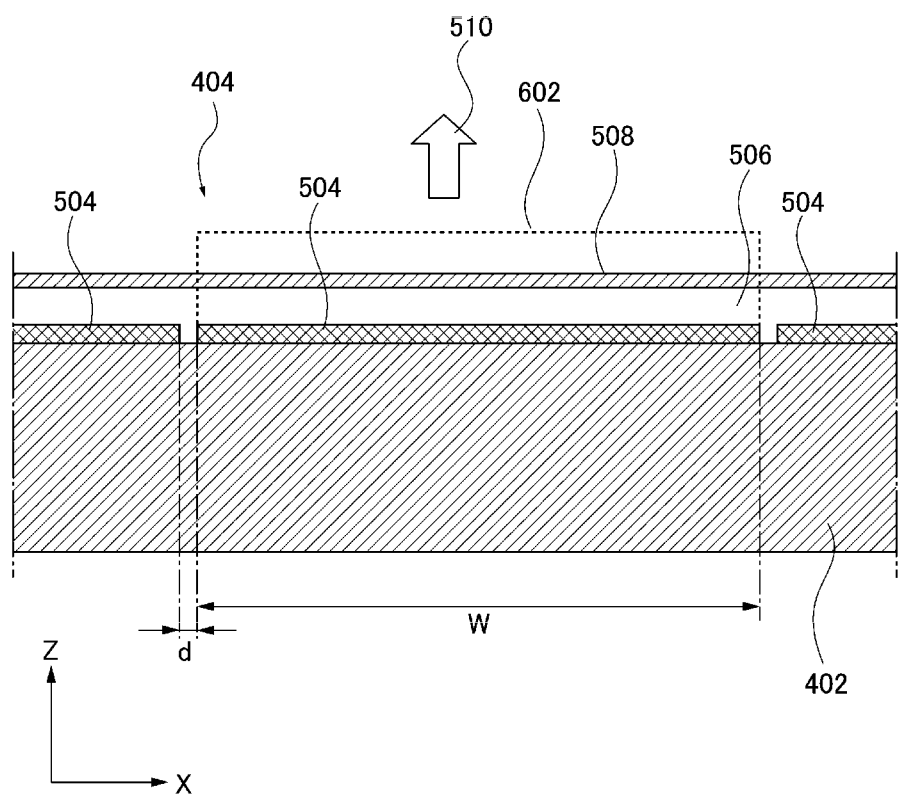
FIG. 5 is an explanatory view of the configuration of a light-emitting portion.

The light-emitting portion 404 will be described with reference to FIG. 5. Note that the Z direction in the figure is orthogonal to the X direction and the Y direction and corresponds to the direction of light emission from the light-emitting portion 404. FIG. 5 is a schematic view of part of a section taken along line A-A of FIG. 4, namely, one light-emitting element and the periphery thereof. The light-emitting substrate 402 has a plurality of lower electrodes 504, a light-emitting layer 506, and an upper electrode 508 formed thereon. The lower electrodes 504 each serve as an independent electrode, and the upper electrode 508 serves as a common electrode. As illustrated in FIG. 5, the lower electrodes 504 each have a width W in the X direction in the figure and have a predetermined interval d to an adjacent lower electrode 504 in the X direction. The light-emitting layer 506 is formed between the lower electrodes 504 and the upper electrode 508. Note that the light-emitting layer 506 may be continuously formed or may be divided into parts each almost equivalent in size to the lower electrode 504. One light-emitting element 602 is achieved with one independent lower electrode 504, the light-emitting layer 506, and the upper electrode 508. A desired electrode is selected from among the plurality of lower electrodes 504. Then, energization of the light-emitting layer 506 through the selected lower electrode 504 and the upper electrode 508 brings the light-emitting layer 506 at the place corresponding to the selected lower electrode 504 into light emission, leading to emitted light 510 through the upper electrode 508. Preferably, each lower electrode 504 is made of metal high in reflectivity to the wavelength of light emission of the light-emitting layer 506, and thus Ag is used in the present embodiment. Alternatively, Al or an Al alloy can be used. Preferably, the upper electrode 508 is transparent to the wavelength of light emission of the light-emitting layer 506, and thus indium tin oxide (ITO) is used in the present embodiment. In the present embodiment, an organic EL film is used as the light-emitting layer 506, but an inorganic EL layer may be used instead of an organic EL layer.

(Array in Light-Emitting Portion)

Figure 6A:
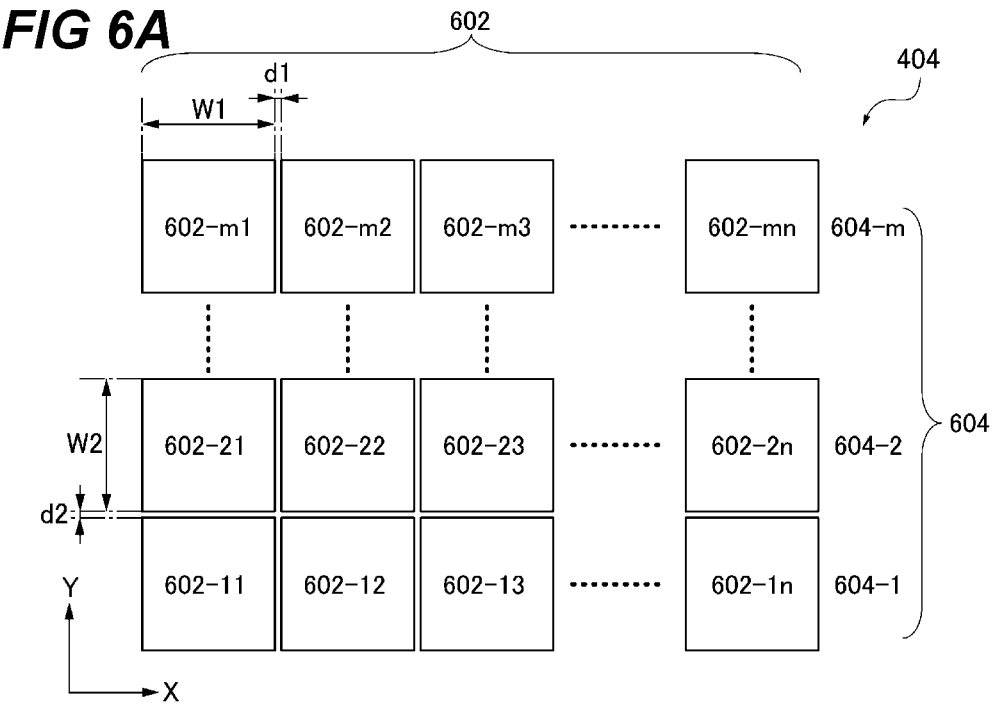
FIGS. 6A and 6B are explanatory views of an array of light-emitting elements, and FIGS. 6C and 6D each illustrate the state of spots of light-emitting elements.

An array in the light-emitting portion 404 will be described with reference to FIGS. 6A and 6B. FIG. 6A illustrates an array of light-emitting elements in the light-emitting portion 404. As illustrated in FIG. 6A, the light-emitting portion 404 includes a plurality of light-emitting elements 602 disposed in rows. The plurality of light-emitting elements 602 is arrayed at predetermined intervals in the X direction in the figure (e.g., at pitches of 21.16 μm at 1200 dpi) in rows in the X direction and is arrayed in columns in the Y direction, resulting in formation of a plurality of light-emitting element arrays (604-1 to 604-*m* in FIG. 6A).

In other words, the light-emitting portion 404 includes the plurality of light-emitting element arrays 604, each including a plurality of light-emitting elements 602 disposed in the X direction as the first direction, disposed in sequence in the Y direction as the second direction orthogonal to the first direction. Specifically, in the light-emitting portion 404, n number of light-emitting elements 602 are arrayed at predetermined intervals in the X direction in a row in the X direction, resulting in formation of a light-emitting element array 604. In addition, the light-emitting portion 404 includes m number of light-emitting element arrays 604 (the first light-emitting element array 604-1, the second light-emitting element array 604-2, . . . , the m-th light-emitting element array 604-*m*), which are formed as above, disposed in sequence in the Y direction.

In the figure, W1 represents the width in the X direction of a light-emitting element 602, and d1 represents the interval between adjacent light-emitting elements 602 in the X direction. In a case where the light-emitting layer 506 is sufficiently thin, the size of a light-emitting element 602 is substantially the same as the size of a lower electrode 504, and thus W1 and d1 may be regarded, respectively, as W and d in FIG. 5. The width W2 in the Y direction of a light-emitting element 602, the interval d2, and the number m of light-emitting element arrays 604 are required to be determined in consideration of the scanning rate in the Y direction, necessary light quantity, and resolution. The light-emitting elements 602 arrayed in the present embodiment have a width W1 of 20.9 μm, an interval d1 of 0.26 μm, and a pitch of 21.16 μm. The light-emitting elements 602 have a width W2 of 20.9 μm equal to the width W1, a width d2 of 0.26 μm equal to the width d1, and a pitch of 21.16 μm. The number m is 6.

Figure 6B:
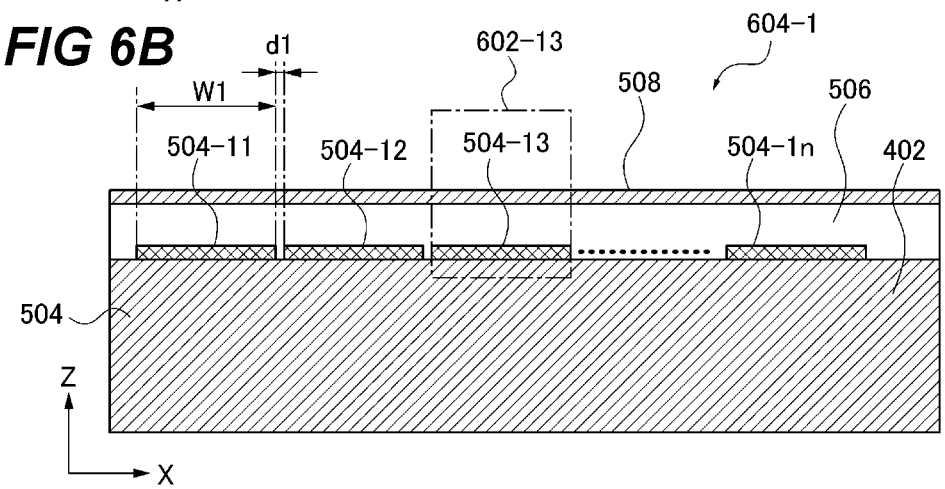

FIG. 6B is a schematic sectional view of the light-emitting element array 604-1. As illustrated in FIG. 6B, lower electrodes 504 with the width W1 and the interval d1 are disposed in the X direction in the figure. Each individual light-emitting element 602 includes an individual lower electrode 504, the part that the individual lower electrode 504 faces in the upper electrode 508, and the light-emitting layer 506 therebetween. As an exemplary configuration of an individual light-emitting element, indicated is a light-emitting element 602-13 surrounded with a dotted line in FIG. 6B.

Note that, in a case where light-emitting elements arrayed in the Y direction in FIG. 6A light up simultaneously, exposure is performed to different positions, between which the pitch is W2+d2, on the photoconductive drum 102 in the rotational direction of the photoconductive drum 102. The timing of lighting of each light-emitting element is shifted in time according to the rotational rate of the photoconductive drum 102, so that exposure can be performed to substantially the same position on the photoconductive drum 102. Such exposure to substantially the same position with light-emitting elements arrayed in the Y direction as above is referred to as multiple exposure. For example, the exposure position exposed with the first light-emitting element array 604-1 illustrated in FIG. 6A (substantially the same position) is subjected to multiple exposure with the second light-emitting element array 604-2.

Figure 6C:
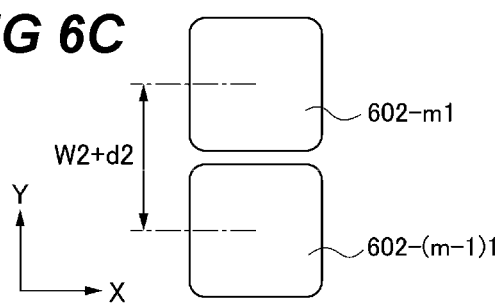
Figure 6D:
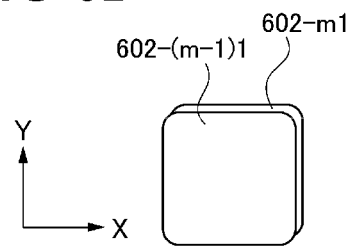

FIGS. 6C and 6D each illustrate the state of spots of light-emitting elements. Herein, given will be cases where exposure onto the photoconductive drum is performed with two light-emitting elements disposed in the Y direction. FIG. 6C illustrates the state of spots of the two light-emitting elements, disposed in the Y direction, in simultaneous lighting. Since the two light-emitting elements 602-*m*1 and 602-(*m*−1)1 are disposed in the Y direction, simultaneous light emission forms spots side by side in the Y direction on the photoconductive drum 102. FIG. 6D illustrates the state of spots in a case where, according to the rotational direction and rotational rate Vdr (mm/s) of the photoconductive drum 102, the timing of lighting of the downstream light-emitting element 602 in the rotational direction is delayed, based on Expression (1). Note that FIG. 6D exemplifies a case where the exposure position on the photoconductive drum exposed with the light-emitting element 602-*m*1 is subjected to multiple exposure with the light-emitting element 602-(*m*−1)1. Here, the timing Tdelay (s) for causing the positions of spots (exposure positions) to be identical on the photoconductive drum is expressed by Expression (1), where W2 (μm) represents the width of a light-emitting element 602 and d2 (μm) represents the interval between light-emitting elements 602.

$$T\text{delay}=((W2+d2)/1000)/Vdr \qquad \text{Expression (1)}$$

In the present embodiment, a signal for light emission is generated such that the maximum value Tw (s) of the duration of light emission at each pixel is equivalent to the time for one line in the Y direction. The maximum value Tw (s) is expressed by Expression (2) with resolution (e.g., 1200 dpi) and the rotational rate Vdr.

$$Tw=(25.4/1200)/Vdr \qquad \text{Expression (2)}$$

Multiple exposure enables exposure at the same position on the photoconductive drum with a plurality of light-emitting elements. An increase in the light quantity that the photoconductive drum 102 receives can be made in proportion to the number of light-emitting elements arrayed in the Y direction. In the present embodiment, one light-emitting element array chip includes six light-emitting elements (light-emitting element array) arrayed in the Y direction, and exposure is performed six times to the same position on the photoconductive drum, leading to formation of a pixel.

(Control Block)

FIG. 7 is a block diagram of the image controller portion 700 and the printed circuit board 202. In the present embodiment, for simplification of description, processing for a single color will be described. In practice, similar pieces of processing for four colors are simultaneously performed in parallel.

(Image Controller Portion)

The image controller portion 700 is provided on the apparatus side different from the printed circuit board 202 (herein, at the image forming apparatus). The image controller portion 700 transmits, to the printed circuit board 202, a signal for controlling the printed circuit board 202. The signal includes a chip select signal indicating the effective range of image data, a clock signal, an image data signal, a signal indicating delimiter every one line of image data (hereinafter, referred to as a line synchronizing signal), and a communication signal with a CPU 703. The signals described above are transmitted, to a light-emitting element array chip 400 in the printed circuit board 202, through a chip select signal line cs_x705, a clock signal line clk706, an image data signal line data 707, a line synchronizing signal line lsync_x708, and a communication signal line 709. The image controller portion 700 performs processing to image data and processing to printing timing. The image controller portion 700 includes an image data generation portion 701, a chip data conversion portion 702, the CPU 703, and a synchronizing signal generation portion 704.

The image data generation portion 701 performs, to image data received from the scanner portion 100 or from outside the image forming apparatus, dithering at the resolution designated by the CPU 703, to generate image data for print output. In the present embodiment, dithering is performed at a resolution of 1200 dpi. The image data indicates two levels with a 1-bit width.

The synchronizing signal generation portion 704 generates a line synchronizing signal. With the cycle in which the surface of the photoconductive drum 102 moves by a pixel size at 1200 dpi (approximately 21.16 μm) in the rotational direction at the rotational rate of the photoconductive drum 102 determined in advance, defined as one line cycle, the CPU 703 notifies the synchronizing signal generation portion 704 of the time interval between cycles of a signal. For example, in a case where printing is performed at a rate of 200 mm/s in the direction of conveyance of a sheet, the synchronizing signal generation portion 704 is notified of the time interval based on one line cycle of 105.8 μs (omission of the second and subsequent decimal places). The CPU 703 calculates the rate in the direction of conveyance of a sheet, with the set value (fixed value) of a printing rate set in a photoconductive-drum rate control portion (not illustrated).

In synchronization with the line synchronizing signal generated by the synchronizing signal generation portion 704, the chip data conversion portion 702 divides image data for one line for the light-emitting element array chips and sends, to the printed circuit board 202, the divided pieces of image data together with the clock signal and the chip select signal.

(Printed Circuit Board)

Next, the configuration of the printed circuit board 202 will be described. The printed circuit board 202 includes a plurality of light-emitting element array chips 400 and a head information storage portion 710.

The head information storage portion 710 serves as a storage device that stores head information, such as the quantity of light emission of each light-emitting element array chip 400 and mount positional information, and is connected to the CPU 703 through the communication signal line 709. The clock signal line 706, the image data signal line 707, the line synchronizing signal line 708, and the communication signal line 709 are connected to all the light-emitting element array chips 400. The chip select signal line 705 is connected to the input of the light-emitting element array chip 400-1. Furthermore, for the chip select signal line 705, the output of the light-emitting element array chip 400-1 is connected to the input of the light-emitting element array chip 400-2 through a signal line 711-1. Furthermore, for the chip select signal line 705, the output of the light-emitting element array chip 400-2 is connected to the input of the light-emitting element array chip 400-3 through a signal line 711-2. As above, the chip select signal line 705 is in cascade connection. Based on the input chip select signal, the clock signal, the line synchronizing signal, the image data signal, and the set value set by the communication signal, each light-emitting element array chip 400 causes each light-emitting element to emit light. In addition, each light-emitting element array chip 400 generates a chip select signal for the next chip.

(Digital Circuit Block inside Chip)

FIG. 8 is a circuit block diagram in a light-emitting element array chip 400. The circuit portion 406 in the light-emitting element array chip 400 includes a digital portion 800 and an analog portion 806. The digital portion 800 has a function of generating a pulse signal for light emission of each light-emitting element and sending the pulse signal to the analog portion 806, based on the set value previously set by the communication signal, the chip select signal, the image data signal, and the line synchronizing signal, in synchronization with the clock signal, and a function of generating a chip select signal for the next chip based on the input chip select signal.

Based on the communication signal from the CPU 703, a communication IF portion 801 controls write and read of the set value to a register portion 802.

The register portion 802 stores the set value necessary for operation. The set value includes exposure timing information for use in an image data storage portion 804, width information and delay information about a pulse signal to be generated by a pulse signal generation portion 805, and set information about a drive current to be set by the analog portion 806.

A chip select signal generation portion 803 delays the input chip select signal to generate a chip select signal for the next chip.

The image data storage portion 804 retains the image data while the input chip select signal is valid and outputs, in synchronization with the line synchronizing signal, the image data to a lighting control portion 807. The details will be described below.

Pulse signal generation portions 805 (805-0 to 805-5) are provided, respectively, to the light-emitting element arrays 604 (604-1 to 604-6). Based on the width information (pulse width) and delay information (delay time) about a pulse signal set in the register portion 802, the pulse signal generation portions 805 each generate a pulse signal necessary for lighting of each light-emitting element in the corresponding light-emitting element array, and output the pulse signal to the lighting control portion 807. The details will be described below.

Based on the image data from the image data storage portion 804, the lighting control portion 807 controls whether or not to output the pulse signal from each pulse signal generation portion 805 to the analog portion 806 every light-emitting element. The details will be described below.

Based on each pulse signal generated by the digital portion 800, the analog portion 806 generates a signal necessary for driving each light-emitting element. The details will be described below.

Next, the operation of the image data storage portion 804 will be described. FIG. 9 is a circuit configuration diagram of the image data storage portion 804.

In the present embodiment, the chip select signal and the line synchronizing signal are denoted with cs_x and lsync_x, respectively, and are negative logic, but may be positive logic. The clock signal and the image data signal are denoted with clk and data, respectively. A clock gate circuit 810 outputs the logical product of the inverted signal of the chip select signal cs_x and the clock signal clk, and outputs, only when cs_x is valid, a clock signal s_clk to a flip-flop circuit 811. The flip-flop circuit 811 receives, as the original input, the image data signal data input to the image data storage portion 804. Flip-flop circuits 811, of which the number is identical to the number of light-emitting elements provided in the longitudinal direction of the light-emitting element array chip (748 in the present embodiment), are connected in series. The flip-flop circuits 811 each operate due to the clock signal s_clk sent from the clock gate circuit 810.

A flip-flop circuit will be described below. Representatively, flip-flop circuits 812-000, 813-000, 814-000, 815-000, 816-000, and 817-000 will be described. The same applies to other flip-flop circuits 812-001 to 812-747, 813-001 to 813-747, 814-001 to 814-747, 815-001 to 815-747, 816-001 to 816-747, and 817-001 to 817-747.

With the output of the flip-flop circuit 811-000 (dly_data_000) as an input, the flip-flop circuit 812-000 operates due to the line synchronizing signal lsync_x. The output of the flip-flop circuit 812-000 (buf_data_0_000) is input to the lighting control portion 807 and the flip-flop circuit 813-000. With the output of the flip-flop circuit 812-000 (buf_data_0_000) as an input, the flip-flop circuit 813-000 operates due to the line synchronizing signal lsync_x. The output of the flip-flop circuit 813-000 (buf_data_1_000) is input to the flip-flop circuit 814-000 and the lighting control portion 807. With the output of the flip-flop circuit 813-000 (buf_data_1_000) as an input, the flip-flop circuit 814-000 operates due to the line synchronizing signal lsync_x. The output of the flip-flop circuit 814-000 (buf_data_2_000) is input to the flip-flop circuit 815-000 and the lighting control portion 807. With the output of the flip-flop circuit 814-000 (buf_data_2_000) as an input, the flip-flop circuit 815-000 operates due to the line synchronizing signal lsync_x. The output of the flip-flop circuit 815-000 (buf_data_3_000) is input to the flip-flop circuit 816-000 and the lighting control portion 807. With the output of the flip-flop circuit 815-000 (buf_data_3_000) as an input, the flip-flop circuit 816-000 operates due to the line synchronizing signal lsync_x. The output of the flip-flop circuit 816-000 (buf_data_4_000) is input to the flip-flop circuit 817-000 and the lighting control portion 807. With the output of the flip-flop circuit 816-000 (buf_data_4_000) as an input, the flip-flop circuit 817-000 operates due to the line synchronizing signal lsync_x. The output of the flip-flop circuit 817-000 (buf_data_5_000) is input to the lighting control portion 807.

FIG. 10 is a timing chart of the operation of the image data storage portion 804 regarding the longitudinal direction of the photoconductive drum. The names of signals in the figure correspond to those in FIG. 9. From time T0 at which cs_x is 0 at a rise in clk to time T1, the image data shifts, for example, in the order from data to dly_data_000 to dly_data_001. At cs_x=0, the clock signal has pulses of which the number is 748 identical to the number of light-emitting elements in the longitudinal direction of the photoconductive drum. Thus, image data for one line is retained as dly_data_000 to dly_data_747. After time T1, retention is performed with no shift operation because cs_x is 1. At time T2 at which lsync_x is 0 at a rise in clk, the image data for one line shifts at a time as buf_data_0_000 to buf_data_0_747, for example, from dly_data_000 to buf_data_0_000 and from dly_data_001 to buf_data_0_001 and then is output to the lighting control portion 807.

Figure 11:
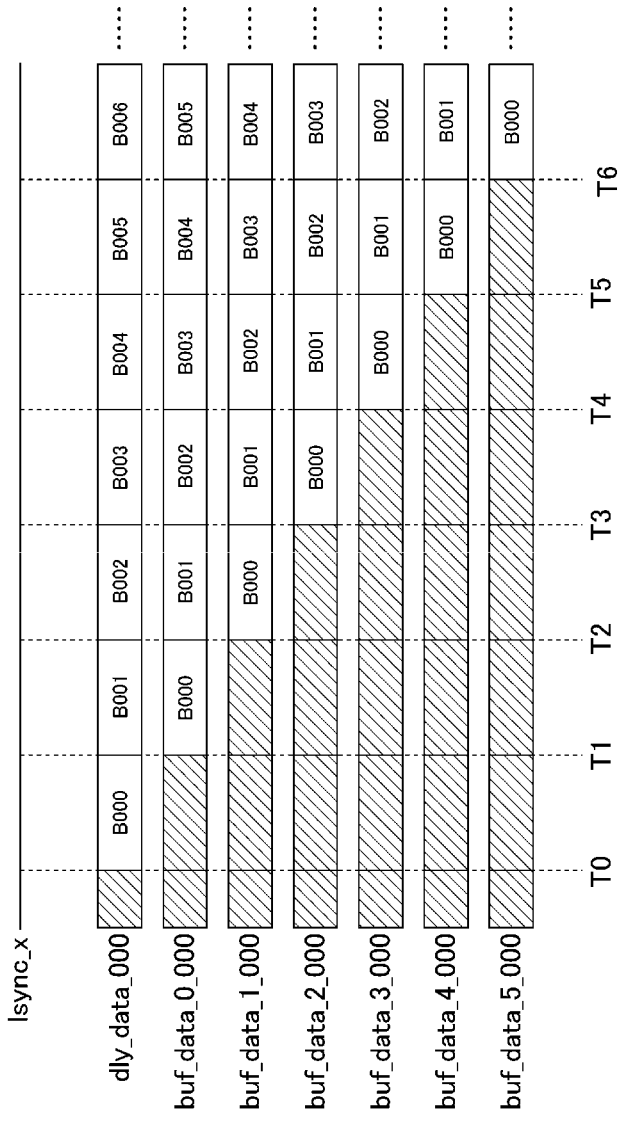
FIG. 11 is a timing chart of the operation of the image data storage portion.

FIG. 11 is a timing chart of the operation of the image data storage portion 804 regarding the rotational direction of the photoconductive drum. Referring to FIG. 11, representatively, described will be the output buf_data_0_000 of the flip-flop circuit 812-000, the output buf_data_1_000 of the flip-flop circuit 813-000, the output buf_data_2_000 of the flip-flop circuit 814-000, the output buf_data_3_000 of the flip-flop circuit 815-000, the output buf_data_4_000 of the flip-flop circuit 816-000, and the output buf_data_5_000 of the flip-flop circuit 817-000 illustrated in FIG. 9. The same applies to all the outputs buf_data_0_001 to buf_data_0_747, buf_data_1_001 to buf_data_1_747, buf_data_2_001 to buf_data_2_747, buf_data_3_001 to buf_data_3_747, buf_data_4_001 to buf_data_4_747, and buf_data_5_001 to buf_data_5_747 of the other flip-flop circuits illustrated in FIG. 9.

As illustrated, every time lsync_x=0 is input, a shift is made, for example, from dly_data_000 to buf_data_0_000 or from buf_data_0_000 to buf_data_1_000. Thus, the value of B000 in dly_data_000 at time T0 is output to the lighting control portion 807, for example, as buf_data_0_000 at time T1, buf_data_1_000 at time T2, and buf_data_2_000 at time T3. Connection of buf_data_0_000, buf_data_1_000, buf_data_2_000, buf_data_3_000, buf_data_4_000, and buf_data_5_000 corresponding to the order from the first light-emitting element to the last light-emitting element for exposure on the photoconductive drum enables achievement of multiple exposure.

Figure 12A:
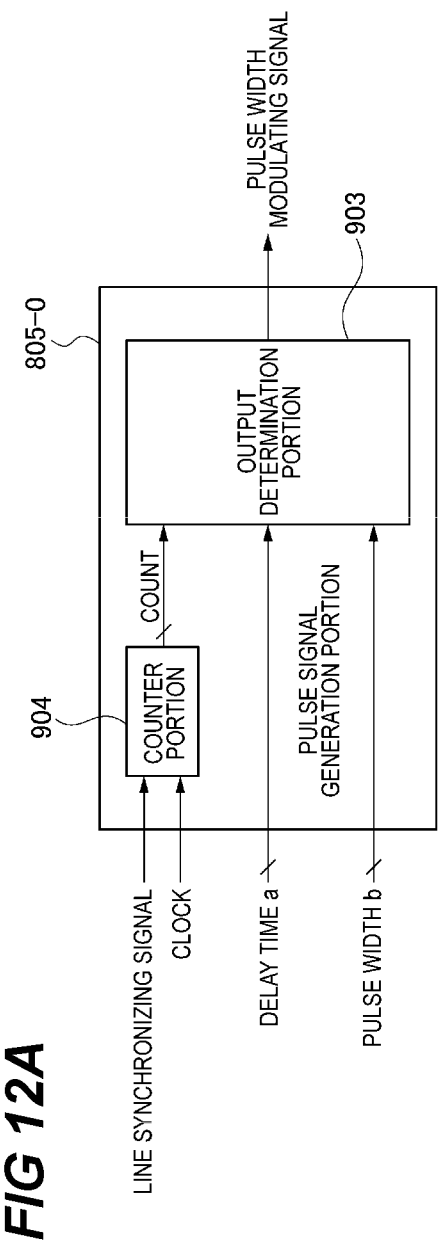
FIG. 12A is a block diagram of a pulse signal generation portion according to the first embodiment.

Next, a pulse signal generation portion (pulse signal generation circuit) 805 will be described. The pulse signal generation portions 805 (805-0 to 805-5), of which the number is identical to the number of light-emitting element arrays, are identical in configuration. Thus, the pulse signal generation portion 805-0 will be exemplarily described herein. FIG. 12A is a block diagram of a pulse signal generation circuit, and FIG. 12B is a timing chart of the operation of the pulse signal generation circuit.

The pulse signal generation portion 805-0 includes an output determination portion 903 and a counter portion 904.

Figure 12B:
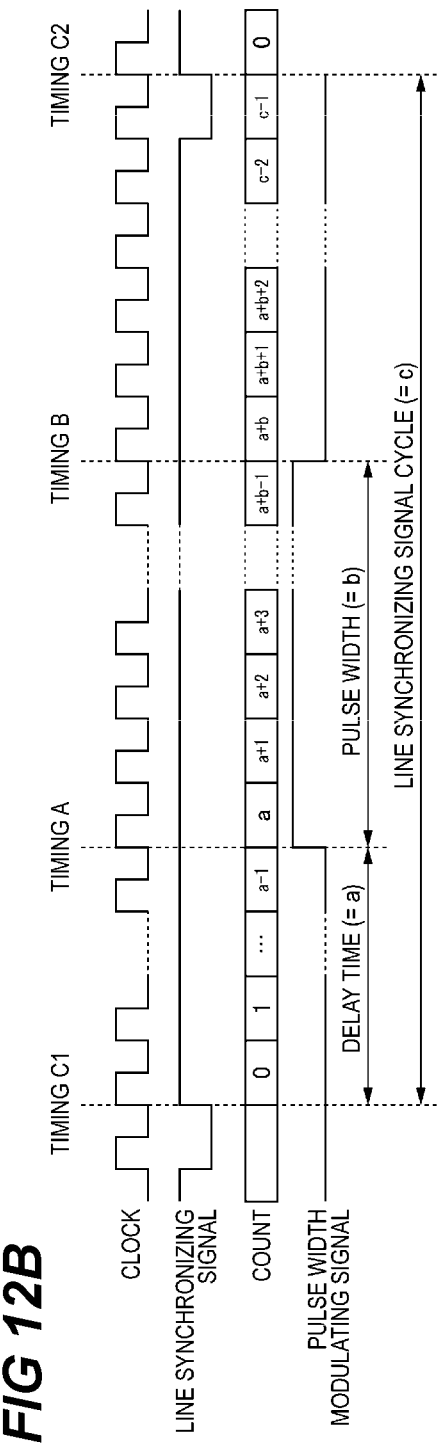
FIG. 12B is a timing chart of the pulse signal generation portion.

The counter portion 904 performs clock counting and resets the count every cycle c of the line synchronizing signal (timing C1 and timing C2 in FIG. 12B).

The output determination portion 903 generates a pulse signal corresponding to the count, pulse width b, and delay time a. The output determination portion 903 generates a pulse signal such that the output is high at the timing at which the count generated by the counter portion 904 reaches the delay time a (timing A in FIG. 12B) and the output is low at the timing of the count a+b after the time corresponding to the pulse width b (timing B in FIG. 12B).

Since the register portion 802 transmits the delay time a and the pulse width b, rewriting in the register portion 802 enables changes in value in units of clock cycles. The delay time a corresponds to the time for determination of the start timing of light emission per cycle of the line synchronizing signal. The pulse width b corresponds to the duration of lighting of a light-emitting element and is almost proportional to the light quantity of a light-emitting element. Thus, the pulse width b is adjusted for a necessary total light quantity on the surface of the photoconductive drum. Note that the delay time a for determination of the start timing of light emission and the pulse width b can be set in the pulse signal generation portions 805-0 to 805-5, individually, for the corresponding light-emitting element array. Thus, the delay time a and the pulse width b set in the pulse signal generation portion 805-0 are defined as a0 and b0, respectively. Similarly, the delay time a and the pulse width b in the pulse signal generation portion 805-1 are defined as a1 and b1, respectively. The delay time a and the pulse width b in the pulse signal generation portion 805-2 are defined as a2 and b2, respectively. The delay time a and the pulse width b in the pulse signal generation portion 805-3 are defined as a3 and b3, respectively. The delay time a and the pulse width b in the pulse signal generation portion 805-4 are defined as a4 and b4, respectively. The delay time a and the pulse width b in the pulse signal generation portion 805-5 are defined as a5 and b5, respectively.

Based on the delay time (delay set value a) from the input timing of the line synchronizing signal to the start timing at which light emission starts and the pulse width (pulse width set value b) from the start timing to the termination timing at which the light emission terminates, each pulse signal generation portion 805 generates, for the corresponding light-emitting element array, a pulse signal (line_pulse) for light emission of the corresponding light-emitting element array.

In other words, the pulse signal generation portions 805 each set the delay time and the pulse width for the corresponding light-emitting element array. Here, the corresponding light-emitting element array indicates a light-emitting element array from among a plurality of light-emitting element arrays disposed in sequence in the rotational direction of the drum in one light-emitting element array chip. In the present embodiment, exemplarily, one light-emitting element array chip includes light-emitting element arrays (first, second, third, fourth, fifth, and sixth light-emitting element arrays), of which the number m is six, disposed in sequence in the rotational direction of the drum.

The pulse signal generation portion 805-0 generates a first pulse signal (line_pulse_0) for light emission of the first light-emitting element array, based on a first delay time (delay set value a0) from the input timing C1 of the line synchronizing signal to a first start timing at which light emission starts and a first pulse width (pulse width set value b0) from the first start timing to a first termination timing at which the light emission terminates before the next input timing C2 of the line synchronizing signal.

The pulse signal generation portion 805-1 generates a second pulse signal (line_pulse_1) for light emission of the second light-emitting element array, based on a second delay time (delay set value a1), different from the first delay time (delay set value a0), from the input timing C1 of the line synchronizing signal to a second start timing at which light emission starts and a second pulse width (pulse width set value b1), identical to the first pulse width (pulse width set value b0), from the second start timing to a second termination timing at which the light emission terminates before the next input timing C2 of the line synchronizing signal.

Here, as set values for setting a pulse signal for each light-emitting element array, when the first delay time and the first pulse width for the first light-emitting element array are defined, respectively, as the delay set value a0 and the pulse width set value b0 and the second delay time and the second pulse width for the second light-emitting element array are defined, respectively, as the delay set value a1 and the pulse width set value b1, the following expressions are satisfied: $a0 \neq a1$, $b0 = b1$, and $a0+b0 \neq a1+b1$.

A third pulse signal (line_pulse_2) for the third light-emitting element array, a fourth pulse signal (line_pulse_3) for the fourth light-emitting element array, a fifth pulse signal (line_pulse_4) for the fifth light-emitting element array, and a sixth pulse signal (line_pulse_5) for the sixth light-emitting element array are generated, similarly to the relationship between the first pulse signal for the first light-emitting element array and the second pulse signal for the second light-emitting element array.

That is, in order to make a shift between pulse signals that change simultaneously, the delay set value as the delay time a for each light-emitting element array satisfies the following expression: $a0 \neq a1 \neq a2 \neq a3 \neq a4 \neq a5$. The pulse width set value as the pulse width b satisfies the following expression: $b5=b4=b3=b2=b1=b0$. The delay set values a0 to a5 and the pulse width set values b0 to b5 satisfy the following expression: $a0+b0 \neq a1+b1 \neq a2+b2 \neq a3+b3 \neq a4+b4 \neq a5+b5$. Due to such setting as above, even at the time of multiple exposure, no overlap occurs in the start timing at which a transition is made from low to high (timing A in FIG. 12B) between the pulse signals and in the termination timing at which a transition is made from high to low (timing B in FIG. 12B) between the pulse signals. According to the setting, each light-emitting element array starts light emission and terminates the light emission. This results in no timing of simultaneous changes of pulse signals for a plurality of light-emitting element arrays arrayed in the rotational direction of the drum in one light-emitting element array chip, so that a reduction can be made in switching noise.

Note that, in the present embodiment, the respective pulse signals for the light-emitting element arrays per cycle of the line synchronizing signal, which do not overlap in the start timing and the termination timing, are identical in pulse width. Thus, without changing, every pulse signal, a drive current to be set in the analog portion, to be described below, a constant total light quantity can be retained between the light-emitting element arrays.

Figure 14:
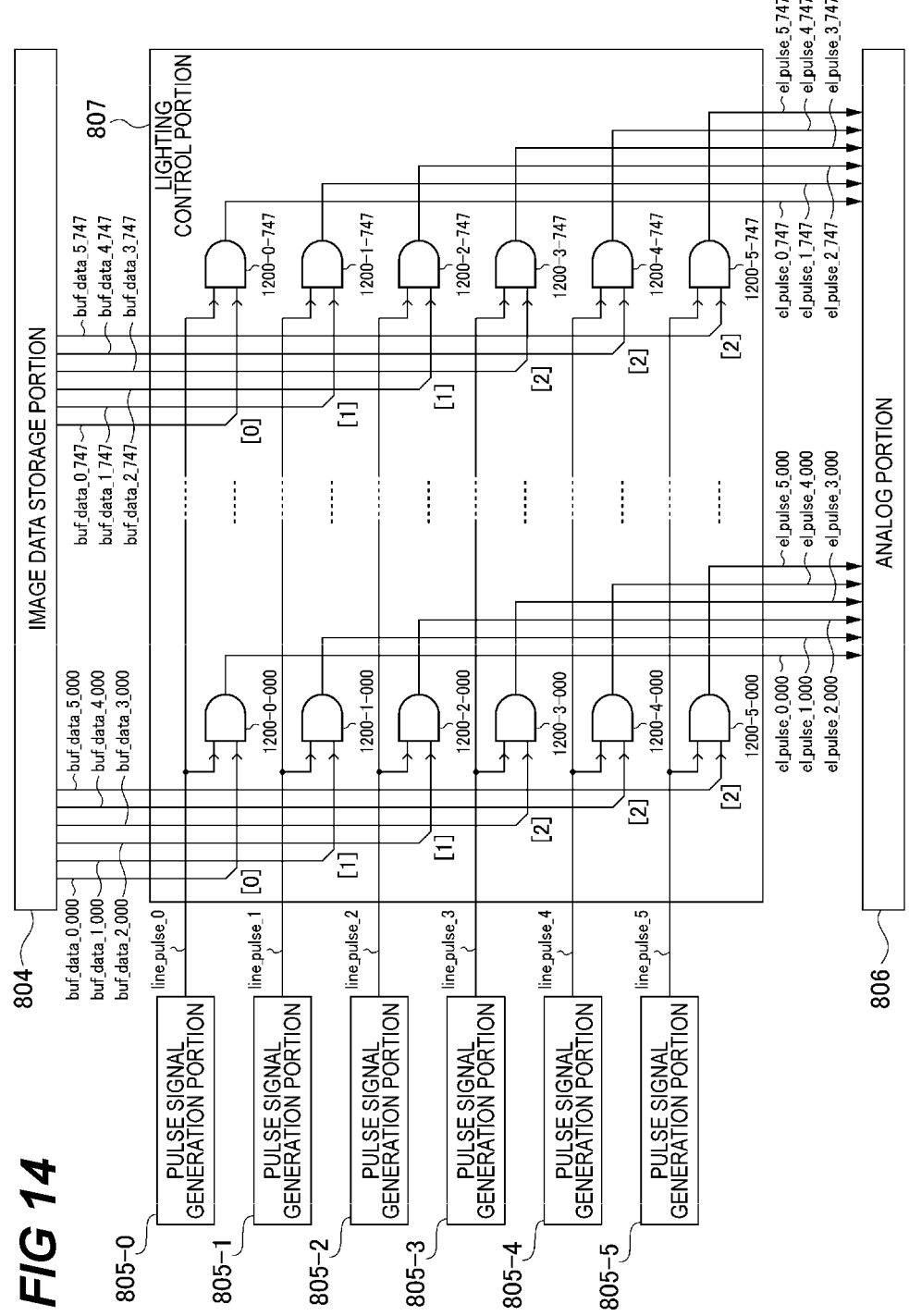
FIG. 14 is a block diagram of a lighting control portion according to the first embodiment.

Next, the lighting control portion 807 will be described with reference to FIG. 14. FIG. 14 is a block diagram of the lighting control portion 807.

According to the image data input from the image data storage portion 804, the lighting control portion 807 controls whether or not to output the pulse signal for the corresponding light-emitting element array generated by each of the pulse signal generation portions 805-0 to 805-5, to the analog portion 806 for every light-emitting element.

Output pulse signals el_pulse_0_000 to el_pulse_0_747 correspond to light-emitting elements 602-11 to 602-1748, respectively. Output pulse signals el_pulse_1_000 to el_pulse_1_747 correspond to light-emitting elements 602-21 to 602-2748, respectively. Output pulse signals el_pulse_2_000 to el_pulse_2_747 correspond to light-emitting elements 602-31 to 602-3748, respectively. Output pulse signals el_pulse_3_000 to el_pulse_3_747 correspond to light-emitting elements 602-41 to 602-4748, respectively. Output pulse signals el_pulse_4_000 to el_pulse_4_747 correspond to light-emitting elements 602-51 to 602-5748, respectively. Output pulse signals el_pulse_5_000 to el_pulse_5_747 correspond to light-emitting elements 602-61 to 602-6748, respectively.

The lighting control portion 807 is provided with AND gates 1200 of which the number is identical to the number of light-emitting elements. Note that, in the present embodiment, because the image signals buf_data_0_000 to buf_data_5_747 from the image data storage portion 804 and the respective pulse signals line_pulse_0 to line_pulse_5 from the pulse signal generation portions 805 (805-0 to 805-5) are positive logic, the AND gate is used for lighting when each of the output pulse signals el_pulse_0_000 to el_pulse_5_747 to the analog portion is 1. However, in a case where either the input or output is negative logic, a logic gate corresponding thereto is required for use.

AND gates 1200-0-000 to 1200-0-747 each have two inputs of which one receives the pulse signal line_pulse_0 generated by the pulse signal generation portion 805-0 and the other receives the corresponding image signal from among the image signals buf_data_0_000 to buf_data_0_747. The AND gates 1200-0-000 to 1200-0-747 output el_pulse_0_000 to el_pulse_0_747, respectively, as the logical product of the signals.

AND gates 1200-1-000 to 1200-1-747 each have two inputs of which one receives the pulse signal line_pulse_1 generated by the pulse signal generation portion 805-1 and the other receives the corresponding image signal from among the image signals buf_data_1_000 to buf_data_1_747. The AND gates 1200-1-000 to 1200-1-747 output elpulse_1_000 to elpulse_1_747, respectively, as the logical product of the signals.

AND gates 1200-2-000 to 1200-2-747 each have two inputs of which one receives the pulse signal line_pulse_2 generated by the pulse signal generation portion 805-2 and the other receives the corresponding image signal from among the image signals buf_data_2_000 to buf_data_2_747. The AND gates 1200-2-000 to 1200-2-747 output el_pulse_2_000 to el_pulse_2_747, respectively, as the logical product of the signals.

AND gates 1200-3-000 to 1200-3-747 each have two inputs of which one receives the pulse signal line_pulse_3 generated by the pulse signal generation portion 805-3 and the other receives the corresponding image signal from among the image signals buf_data_3_000 to buf_data_3_747. The AND gates 1200-3-000 to 1200-3-747 output el_pulse_3_000 to el_pulse_3_747, respectively, as the logical product of the signals.

AND gates 1200-4-000 to 1200-4-747 each have two inputs of which one receives the pulse signal line_pulse_4 generated by the pulse signal generation portion 805-4 and the other receives the corresponding image signal from among the image signals buf_data_4_000 to buf_data_4_747. The AND gates 1200-4-000 to 1200-4-747 output el_pulse_4_000 to el_pulse_4_747, respectively, as the logical product of the signals.

AND gates 1200-5-000 to 1200-5-747 each have two inputs of which one receives the pulse signal line_pulse_5 generated by the pulse signal generation portion 805-5 and the other receives the corresponding image signal from among the image signals buf_data_5_000 to buf_data_5_747. The AND gates 1200-5-000 to 1200-5-747 output el_pulse_5_000 to el_pulse_5_747, respectively, as the logical product of the signals.

As above, based on the value of the image data signal, performed is control of whether or not the pulse signal generated for each light-emitting element array is to be output to the analog portion 806.

Figure 13A:
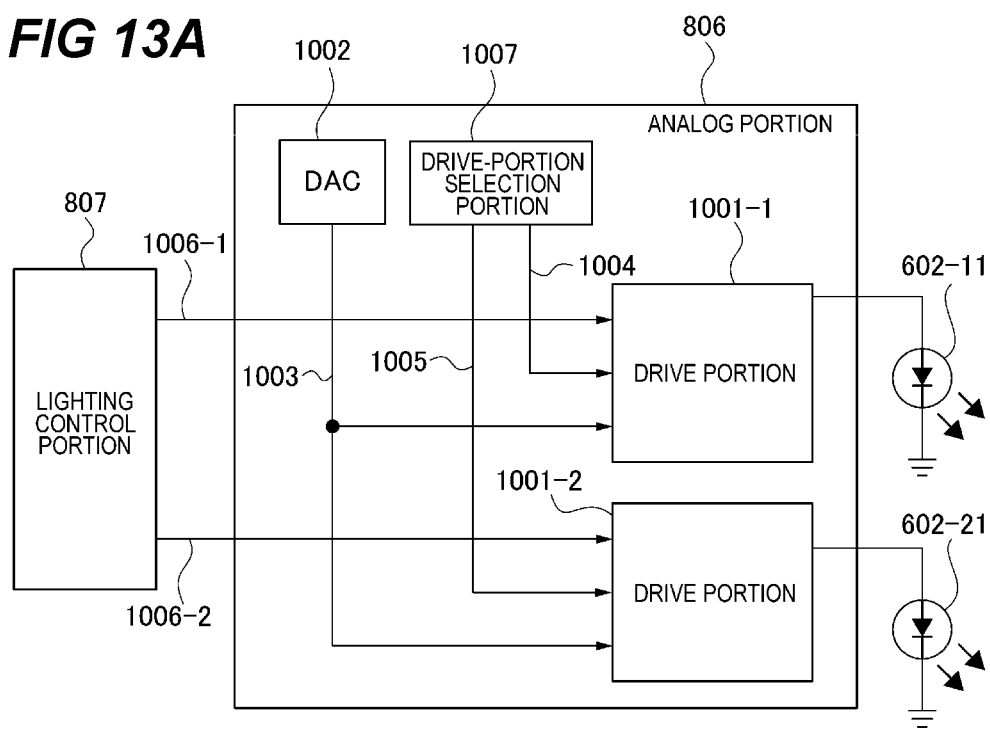
FIG. 13A is a block diagram of an analog portion.

Next, the analog portion 806 will be described. FIG. 13A is a block diagram of the analog portion 806. In the present embodiment, for simplification of description, the analog portion 806 will be described with reference to drive portions 1001-1 and 1001-2 that drive two light-emitting elements 602-11 and 602-21, respectively. However, the analog portion 806 has similar drive portions corresponding to all the light-emitting elements in the light-emitting element array chip 400.

The lighting control portion 807 generates a pulse signal that controls the ON timing of a light-emitting element and inputs the pulse signal to the drive portions 1001-1 and 1001-2 through signal lines 1006-1 and 1006-2, respectively. Based on the data set in the register portion 802, a digital-analog converter (DAC) 1002 supplies an analog voltage that determines a drive current to the drive portions 1001-1 and 1001-2 through a signal line 1003. Based on the data set in the register portion 802, a drive-portion selection portion 1007 supplies a drive-portion select signal that selects a drive portion to the drive portions 1001-1 and 1001-2 through signal lines 1004 and 1005, respectively. A high drive-portion select signal is generated for a drive portion to be selected. For example, in order to select the drive portion 1001-1, a high drive-portion select signal is supplied to only the signal line 1004 and a low drive-portion select signal is supplied to a signal line connected to another drive portion, such as the signal line 1005. To each of the drive portions 1001-1 and 1001-2, the analog voltage to be input through the signal line 1003 at the timing of selection by the drive-portion selection portion 1007 (timing at which the drive-portion select signal becomes high) is set. The CPU 703 (refer to FIG. 7) selects a drive portion in sequence through the register portion 802 and sets the voltage corresponding to the selected drive portion, so that the analog voltage is set in all the drive portions with a single DAC 1002. Due to the operation described above, the analog voltage that determines a drive current and the pulse signal are input to each of the drive portions 1001-1 and 1001-2, so that the light-emitting elements 602-11 and 602-21 are each independently controlled in drive current and in the duration of light emission by a drive circuit to be described below.

Figure 13B:
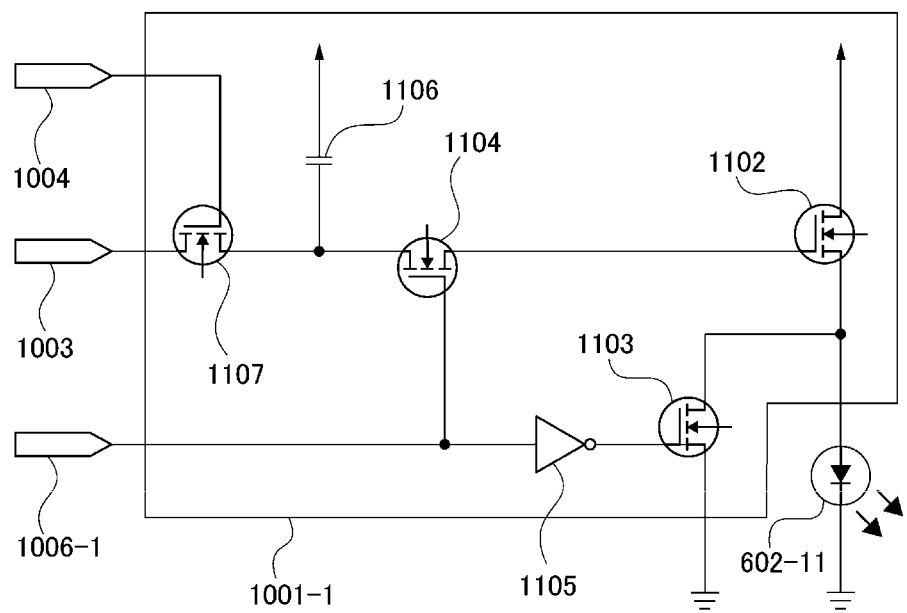
FIG. 13B is an explanatory diagram of a circuit in a drive portion.

FIG. 13B illustrates a circuit in the drive portion 1001-1. Note that a drive portion for another light-emitting element (e.g., 1001-2) drives due to a similar circuit. According to a value of the gate voltage, a MOSFET 1102 supplies a drive current to the light-emitting element 602-11. When the gate voltage is low in level, the MOSFET 1102 controls the drive current to be off (for non-lighting). A MOSFET 1104 has a gate to which the signal line (pulse signal transmission line) 1006-1 is connected, and transfers, in response to a high pulse signal, the voltage charged in a capacitor 1106 to the MOSFET 1102. A MOSFET 1107 has a gate to which the signal line 1004 is connected for reception of the drive-portion select signal transmitted from the drive-portion selection portion 1007. In response to reception of a high drive-portion select signal, the MOSFET 1107 switches on, so that the capacitor 1106 is charged with the analog voltage output from the DAC 1002 (through the signal line 1003). In the present embodiment, the DAC 1002 sets the analog voltage to the capacitor 1106 at any timing before image forming, and the level of voltage is retained with the MOSFET 1107 kept off during image forming. Due to the above operation, the MOSFET 1102 supplies a drive current to the light-emitting element 602-11, according to the set analog voltage and the pulse signal. In a case where the light-emitting element 602-11 has a large input capacitance and a low response rate for turning off, an increase can be made in the rate of turning off with a MOSFET 1103. The MOSFET 1103 has a gate to which the pulse signal logic inverted by an inverter 1105 is input. A low pulse signal brings the gate of the MOSFET 1103 high, leading to forcible discharge of the electric charges charged in the input capacitance of the light-emitting element 602-11.

Here, the delay time a and the pulse width b to be set in the pulse signal generation portions 805-0 to 805-5 corresponding one-to-one to the light-emitting element arrays will be specifically described. In the present embodiment, the delay time a and the pulse width b to be set in the pulse signal generation portions 805-0 to 805-5 corresponding one-to-one to the light-emitting element arrays are set according to the table in FIG. 15. Note that the set values in FIG. 15 are exemplary and are not limiting, and thus appropriate setting should be made as necessary.

Referring to FIG. 15, as the target circuit, the pulse signal generation portions 805-0 to 805-5 corresponding one-to-one to the light-emitting element arrays illustrated in FIG. 8 are provided. The set value of the delay time a and the set value of the pulse width b each correspond to a signal from the register portion 802 and are set in each of the pulse signal generation portions corresponding one-to-one to the light-emitting element arrays. The delay time a and the pulse width b to be set in each of the pulse signal generation portions 805-0 to 805-5 corresponding one-to-one to the light-emitting element arrays in FIG. 15 are determined in value so as to satisfy the following conditions.

The delay time a in condition 1 varies in value between the light-emitting element arrays. That is, the set value of the delay time a to be set in each of the pulse signal generation portions 805 corresponding one-to-one to the light-emitting element arrays satisfies the following expression: $a0 \neq a1 \neq a2 \neq a3 \neq a4 \neq a5$. Referring to FIG. 15, the set value "10" of the delay time a corresponds to the set value a0 of the delay time a to be set in the pulse signal generation portion 805-0 corresponding to the light-emitting element array 604-1. The set value "20" of the delay time a corresponds to the set value a1 of the delay time a to be set in the pulse signal generation portion 805-1 corresponding to the light-emitting element array 604-2. The set value "30" of the delay time a corresponds to the set value a2 of the delay time a to be set in the pulse signal generation portion 805-2 corresponding to the light-emitting element array 604-3. The set value "40" of the delay time a corresponds to the set value a3 of the delay time a to be set in the pulse signal generation portion 805-3 corresponding to the light-emitting element array 604-4. The set value "50" of the delay time a corresponds to the set value a4 of the delay time a to be set in the pulse signal generation portion 805-4 corresponding to the light-emitting element array 604-5. The set value "60" of the delay time a corresponds to the set value a5 of the delay time a to be set in the pulse signal generation portion 805-5 corresponding to the light-emitting element array 604-6.

The result of addition of the delay time a and the pulse width b in condition 2 varies in value between the light-emitting element arrays. That is, the result of addition of the set value of the delay time a and the set value of the pulse width b corresponding to each light-emitting element array satisfies the following expression: $a0+b0 \neq a1+b1 \neq a2+b2 \neq a3+b3 \neq a4+b4 \neq a5+b5$. Note that the set value of the pulse width b satisfies the following expression: $b0=b1=b2=b3=b4=b5$.

Condition 1 corresponds to a condition for shifting in the start timing of light emission between the light-emitting element arrays every cycle of the line synchronizing signal. Thus, light-emitting elements different in light-emitting element array are not brought into lighting, simultaneously.

Condition 2 corresponds to a condition for shifting in the termination timing of light emission between the light-emitting element arrays every cycle of the line synchronizing signal. Thus, light-emitting elements different in light-emitting element array are not brought into non-lighting, simultaneously.

As described above, in the present embodiment, two-dimensionally arrayed light-emitting elements are segmented into some regions (in the present embodiment, six regions each corresponding to a light-emitting element array), and shifting is performed in the start timing and termination timing of light emission of the light-emitting elements between the regions. Thus, with a reduction in the number of times of simultaneous switching per cycle of the line synchronizing signal, a reduction can be made in switching noise.

Second Embodiment

An image forming apparatus including an exposure head according to a second embodiment will be described. The present embodiment is similar to the first embodiment in terms of the entire configuration of the image forming apparatus and the fundamental configuration of the exposure head. The present embodiment is different from the first embodiment in terms of a pulse signal generation portion 1405 and the connections of signal lines thereof in a digital portion 800 in a light-emitting element array chip 400. Differences between the present embodiment and the first embodiment will be described.

Figure 18A:
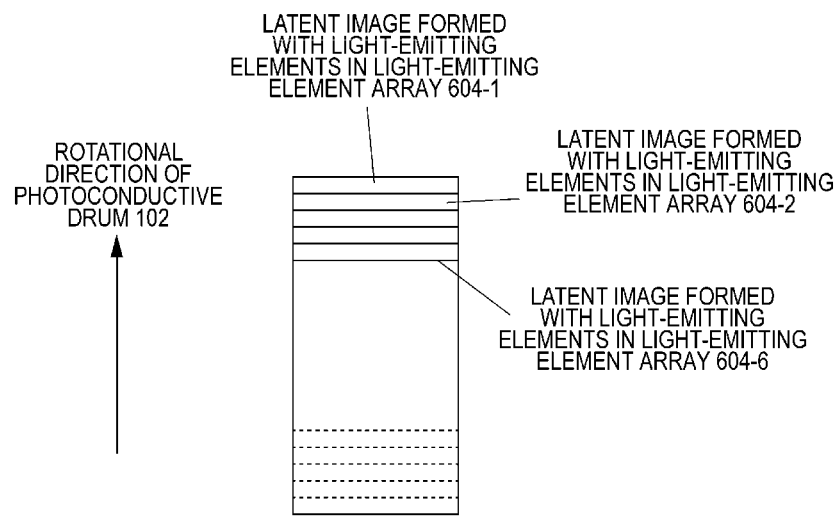
FIGS. 18A and 18B are explanatory views of pixels due to multiple exposure.

In the first embodiment, multiple exposure to the same exposure position with a light-emitting element in each light-emitting element array leads to formation of a pixel in each line, but the start timing and termination timing of light emission vary between the light-emitting element arrays. Thus, respective pixels in the lines (light-emitting element arrays) are different in the position of formation of a latent image in the rotational direction of the photoconductive drum 102. Specifically, as illustrated in FIG. 18A, a latent image formed with light-emitting elements in the second light-emitting element array 604-2 is different in position in the rotational direction of the drum from a latent image formed with light-emitting elements in the first light-emitting element array 604-1 by the difference between the delay set value a0 and the delay set value a1 each as the delay time. Thus, multiple exposure is likely to cause a latent image to blur.

Thus, in the present embodiment, for multiple exposure with the second light-emitting element array 604-2 to the exposure position exposed with the first light-emitting element array 604-1, the following arrangement is made.

That is, based on a first delay time T set in the first light-emitting element array 604-1 in the previous cycle of the line synchronizing signal, a pulse signal for light emission of the second light-emitting element array 604-2 is set in a cycle of the line synchronizing signal for multiple exposure with the second light-emitting element array 604-2.

Furthermore, based on a delay time different from the first delay time T set in the first light-emitting element array 604-1 in the previous cycle of the line synchronizing signal, a pulse signal for light emission of the first light-emitting element array 604-1 is set.

Specific description will be given with reference to FIGS. 16 to 20C.

Figure 16:
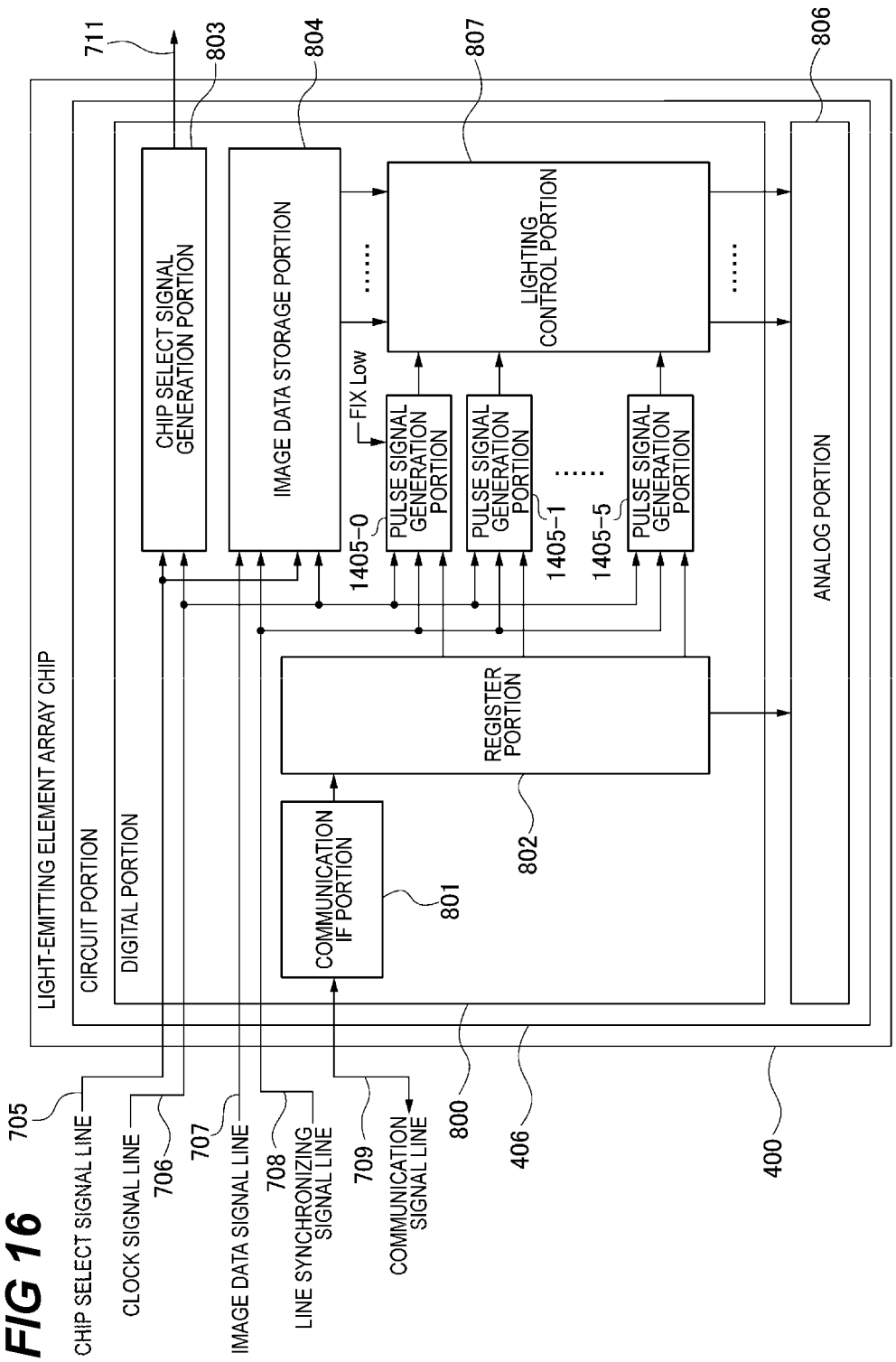
FIG. 16 is a circuit block diagram in a light-emitting element array chip according to a second embodiment.

FIG. 16 is a circuit block diagram in a light-emitting element array chip 400 according to the second embodiment. The configuration of pulse signal generation portions (pulse signal generation circuits) 1405 corresponding one-to-one to light-emitting element arrays in the light-emitting element array chip is different from that according to the first embodiment. In the present embodiment, among the pulse signal generation portions 1405-0 to 1405-5 corresponding one-to-one to the light-emitting element arrays, the preceding pulse signal generation portion and the next pulse signal generation portion are connected through a signal line for transmission of a delay time signal such that the delay time signal set in the preceding pulse signal generation portion is transmitted to the next pulse signal generation portion. That is, the pulse signal generation portion 1405-0 as the preceding pulse signal generation portion is connected to the pulse signal generation portion 1405-1 as the next pulse signal generation portion through the signal line. Similarly, the pulse signal generation portion 1405-1 is connected to the next pulse signal generation portion 1405-2, the pulse signal generation portion 1405-2 is connected to the next pulse signal generation portion 1405-3, the pulse signal generation portion 1405-3 is connected to the next pulse signal generation portion 1405-4, and the pulse signal generation portion 1405-4 is connected to the next pulse signal generation portion 1405-5. Such a delay time signal as above will be described in detail below.

Figures 17A, 17B:
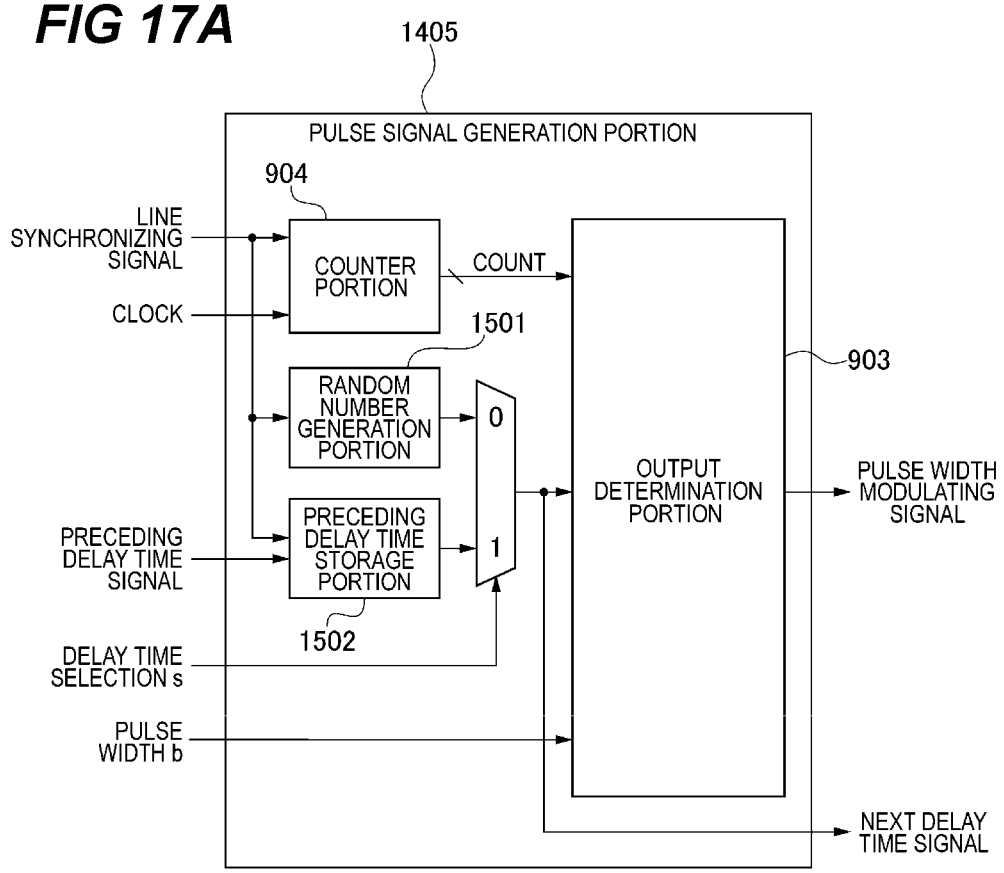
FIG. 17A is a block diagram of a pulse signal generation portion according to the second embodiment.
FIG. 17B is a table of set values to be set in pulse signal generation portions according to the second embodiment.

FIG. 17A is a block diagram of a pulse signal generation portion (pulse signal generation circuit) 1405. The pulse signal generation portions 1405 (1405-0 to 1405-5) are provided one-to-one to light-emitting element arrays 604 (604-1 to 604-6). The pulse signal generation portions 1405 (1405-0 to 1405-5), of which the number is identical to the number of light-emitting element arrays, are identical in configuration.

Such a pulse signal generation portion 1405 includes an output determination portion 903 and a counter portion 904. The counter portion 904 and the output determination portion 903 are similar in operation to those according to the first embodiment.

Furthermore, the pulse signal generation portion 1405 includes a random number generation portion 1501 and a preceding delay time storage portion 1502. The random number generation portion 1501 serves as a delay time generation portion that generates a delay time different every cycle of the line synchronizing signal. The preceding delay time storage portion 1502 serves as a delay time storage portion that stores the delay time set for the light-emitting element array.

Since the delay time a, in FIG. 12A, to the pulse signal generation portion 805 according to the first embodiment corresponds to a signal from the register portion 802, any value can be set for the delay time a in the register portion 802. In the present embodiment, a signal corresponding to such a delay time a is delay time T, and the delay time T can be selected from two types of signals below. Selection of the delay time T is determined due to delay time selection s. Because the delay time selection s corresponds to a signal from a register portion 802, rewriting in the register portion 802 enables selection.

Two types of signals selectable as the delay time T will be described. One of the two types of signals corresponds to the random number generated by the random number generation portion 1501. Due to generation by the random number generation portion 1501, the random number is updated every time the line synchronizing signal is asserted. A method of generating a random number can be achieved, for example, with a method of reading sequentially random numbers written in advance in a memory, or a method of generating a pseudorandom number with an M-sequence based on shift registers and exclusive OR. The other of the two types of signals corresponds to the preceding delay time signal. Regarding the term "preceding", in a case where multiple exposure with the second light-emitting element array is performed to the exposure position exposed with the first light-emitting element array, the pulse signal generation portion corresponding to the first light-emitting element array is preceding to the pulse signal generation portion corresponding to the second light-emitting element array. Therefore, in a case where the pulse signal generation portion 1405 illustrated in FIG. 17A is the pulse signal generation portion 1405-1 corresponding to the second light-emitting element array, the preceding delay time signal and the next delay time signal are as follows:

The preceding delay time signal in the pulse signal generation portion 1405-1 corresponding to the second light-emitting element array corresponds to the next delay time signal output from the pulse signal generation portion 1405-0 corresponding to the first light-emitting element array. Similarly, the preceding delay time signal in the pulse signal generation portion 1405-2 corresponding to the third light-emitting element array corresponds to the next delay time signal output from the pulse signal generation portion 1405-1 corresponding to the second light-emitting element array. The preceding delay time signal to the pulse signal generation portion 1405-3 corresponding to the fourth light-emitting element array corresponds to the next delay time signal output from the pulse signal generation portion 1405-2 corresponding to the third light-emitting element array. The preceding delay time signal in the pulse signal generation portion 1405-4 corresponding to the fifth light-emitting element array corresponds to the next delay time signal output from the pulse signal generation portion 1405-3 corresponding to the fourth light-emitting element array. The preceding delay time signal in the pulse signal generation portion 1405-5 corresponding to the sixth light-emitting element array corresponds to the next delay time signal output from the pulse signal generation portion 1405-4 corresponding to the fifth light-emitting element array. Note that no preceding pulse signal generation portion is present in the pulse signal generation portion 1405-0 and thus the delay time selection s is set at 0. The preceding delay time storage portion 1502 of each of the pulse signal generation portions 1405-1 to 1405-5 updates the input preceding delay time signal (next delay time signal), namely, the delay time T every input (cycle) of the line synchronizing signal.

Either of the two types of signals is selected due to the delay time selection s that is a signal from the register portion 802, so that the delay time T can be determined. Specifically, when the delay time selection s is 0, the random number generated by the random number generation portion 1501 is selected as the delay time T. When the delay time selection s is 1, the preceding delay time signal stored in the preceding delay time storage portion 1502 is selected as the delay time T. In the present embodiment, the set value of the delay time selection s and the set value of the pulse width b are indicated in FIG. 17B. That is, in the present embodiment, the delay time selection s and the pulse width b to be set in each of the pulse signal generation portions 1405-0 to 1405-5 corresponding one-to-one to the light-emitting element arrays are set according to the table in FIG. 17B. Note that the set values in FIG. 17B are exemplary and are not limiting, and thus appropriate setting should be made as necessary.

Referring to FIG. 17B, as the target circuit, the pulse signal generation portions (pulse signal generation circuits) 1405-0 to 1405-5 corresponding one-to-one to the light-emitting element arrays illustrated in FIG. 16 are provided. The set value of the delay time selection s and the set value of the pulse width b each correspond to a signal from the register portion and are set in each of the pulse signal generation portions 1405-0 to 1405-5 corresponding one-to-one to the light-emitting element arrays.

The operation of a pulse signal generation portion will be described with reference to FIGS. 19A and 19B. FIG. 19A is a timing chart of the pulse signal generation portion 1405-0 illustrated in FIG. 16 in the present embodiment. The pulse signal generation portion 1405-0 includes an output determination portion 903, a counter portion 904, a random number generation portion 1501, and a preceding delay time storage portion 1502 as described above.

The counter portion 904 performs clock counting and resets the count every cycle c of the line synchronizing signal (timing C1 and timing C2 in FIG. 19A).

The output determination portion 903 generates a pulse signal corresponding to the count, pulse width b, and delay time T. The output determination portion 903 generates a pulse signal such that the output is high at the timing at which the count generated by the counter portion 904 reaches R1 (timing A in FIG. 19A) and the output is low at the timing of the count R1+b after the time corresponding to the pulse width b (timing B in FIG. 19A).

Since the register portion 802 transmits the pulse width b, rewriting in the register portion 802 enables a change in value in units of clock cycles. The random number for the delay time T is updated every time the line synchronizing signal is asserted.

Next, the respective delay times T of the pulse signal generation portions 1405-0 to 1405-5 corresponding one-to-one to the light-emitting element arrays will be described. FIG. 19B is a timing chart of the operation regarding the delay time T of the circuit of each of the pulse signal generation portions 1405-0 to 1405-5. For the delay time T of the pulse signal generation portion 1405-0 to which no preceding pulse signal generation portion is present, a random number is generated every time the line synchronizing signal is asserted. Referring to FIG. 19B, random numbers R0, R1, and R2 are generated in sequence to be used as the delay time T. Meanwhile, since the preceding delay time T is used in each of the pulse signal generation portions 1405-1 to 1405-5 to which the preceding pulse signal generation portion is present, the shift register operates every time the line synchronizing signal is asserted.

That is, every cycle of the line synchronizing signal, the delay time T of the preceding pulse signal generation portion 1405-0 is stored in the preceding delay time storage portion 1502 of the next pulse signal generation portion 1405-1. Then, in response to the next input of the line synchronizing signal, based on the delay time T stored in the preceding delay time storage portion 1502, the pulse signal generation portion 1405-1 generates a pulse signal for light emission of the second light-emitting element array. Similarly, in the other pulse signal generation portions to which the preceding pulse signal generation portion is present, the preceding delay time T is stored in the previous cycle of the line synchronizing signal, and, in response to the next input of the line synchronizing signal, a pulse signal is generated based on the preceding delay time T stored in the preceding delay time storage portion 1502.

Figure 20A:
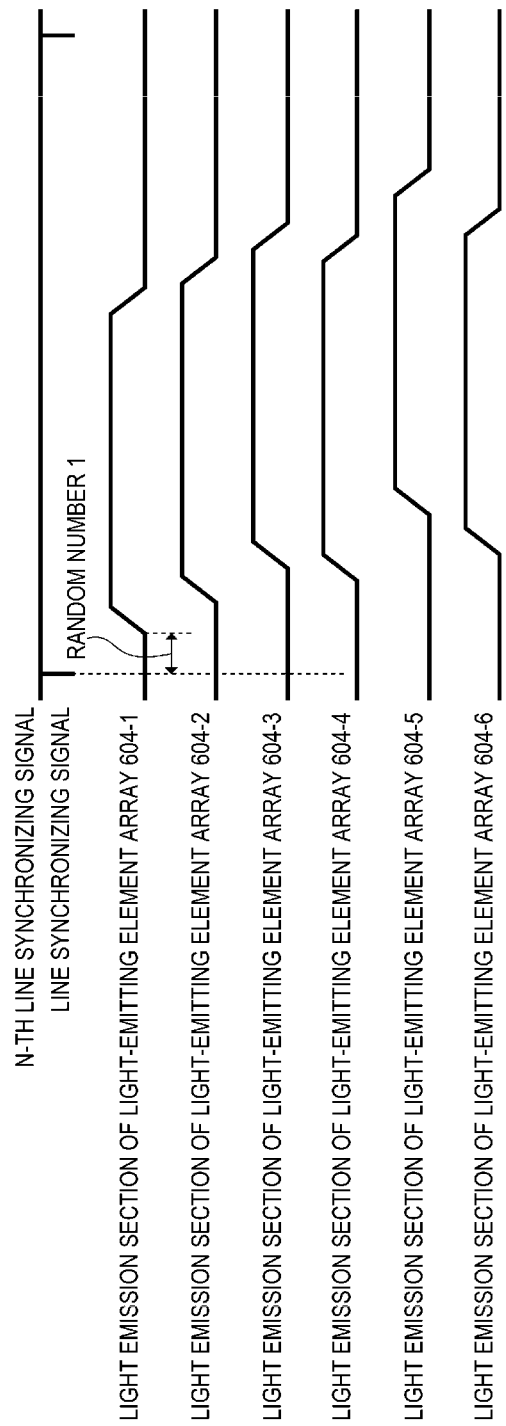

FIGS. 20A, 20B, and 20C illustrate the transitions of sections of light emission of the light-emitting element arrays 604-1 to 604-6 in the present embodiment.

FIG. 20A illustrates the sections of light emission of the light-emitting element arrays 604-1 to 604-6 responsive to the N-th input of the line synchronizing signal. In response to input of the line synchronizing signal, the random number generation portion 1501 of the pulse signal generation portion 1405-0 corresponding to the light-emitting element array 604-1 generates a random number (random number 1 in the figure), resulting in determination of the delay time T (start timing of light emission) of the light-emitting element array 604-1. The delay time T (random number 1) of the light-emitting element array 604-1 is sent to the pulse signal generation portion 1405-1 corresponding to the next light-emitting element array 604-2 and then is stored in the preceding delay time storage portion 1502 of the pulse signal generation portion 1405-1. Then, based on the delay time of the start timing varying between the light-emitting element arrays, each pulse signal generation portion generates a pulse signal for light emission of the corresponding light-emitting element array illustrated in FIG. 20A.

Next, FIG. 20B illustrates the sections of light emission of the light-emitting element arrays 604-1 to 604-6 responsive to the (N+1)-th input of the line synchronizing signal. In response to input of the line synchronizing signal, the random number generation portion 1501 of the pulse signal generation portion 1405-0 corresponding to the light-emitting element array 604-1 generates a random number (random number 2 in the figure), resulting in determination of the delay time T (start timing of light emission) of the light-emitting element array 604-1. At this time, the random number is changed to the random number 2 different from the random number 1 due to the N-th line synchronizing signal. In other words, the random number generation portion 1501 generates a delay time (random number 2) different from the delay time T (random number 1) set for the light-emitting element array 604-1 in the N-th cycle of the line synchronizing signal as the previous line synchronizing signal. For the light-emitting element array 604-2, the delay time T stored in the preceding delay time storage portion 1502 is selected due to the set value "1" as a signal of the delay time selection s. Here, the delay time T stored in the preceding delay time storage portion 1502 corresponds to the delay time T (random number 1) set for the light-emitting element array 604-1 in the N-th cycle of the line synchronizing signal as the previous line synchronizing signal. Thus, the pulse signal generation portion 1405-1 corresponding to the light-emitting element array 604-2 determines the section of lighting identical in timing to that of the light-emitting element array 604-1 due to the N-th line synchronizing signal. Note that the delay time T (random number 2) of the light-emitting element array 604-1 is sent to the pulse signal generation portion 1405-1 corresponding to the next light-emitting element array 604-2 and then is stored in the preceding delay time storage portion 1502 of the pulse signal generation portion 1405-1. The delay time T (random number 1) of the light-emitting element array 604-2 is sent to the pulse signal generation portion 1405-2 corresponding to the next light-emitting element array 604-3 and then is stored in the preceding delay time storage portion 1502 of the pulse signal generation portion 1405-2. Then, based on the delay time of the start timing varying between the light-emitting element arrays, each pulse signal generation portion generates a pulse signal for light emission of the corresponding light-emitting element array illustrated in FIG. 20B.

Next, FIG. 20C illustrates the sections of light emission of the light-emitting element arrays 604-1 to 604-6 responsive to the (N+2)-th input of the line synchronizing signal. In response to input of the line synchronizing signal, the random number generation portion 1501 of the pulse signal generation portion 1405-0 corresponding to the light-emitting element array 604-1 generates a random number (random number 3 in the figure), resulting in determination of the delay time T (start timing of light emission) of the light-emitting element array 604-1. At this time, the random number is changed to the random number 3 different from the random number 1 due to the N-th line synchronizing signal and the random number 2 due to the (N+1)-th line synchronizing signal. Note that the random number generation portion 1501 generates at least different random numbers of which the number is identical to the number of light-emitting element arrays in one light-emitting element array chip. For the light-emitting element array 604-2, the delay time T stored in the preceding delay time storage portion 1502 is selected due to the set value "1" as a signal of the delay time selection s. Here, the delay time T stored in the preceding delay time storage portion 1502 corresponds to the delay time T (random number 2) set for the light-emitting element array 604-1 in the (N+1)-th cycle of the line synchronizing signal as the previous line synchronizing signal. Thus, the pulse signal generation portion 1405-1 corresponding to the light-emitting element array 604-2 determines the section of lighting identical in timing to that of the light-emitting element array 604-1 due to the (N+1)-th line synchronizing signal. Similarly, for the light-emitting element array 604-3, the delay time T stored in the preceding delay time storage portion 1502 is selected due to the set value "1" as a signal of the delay time selection s. Here, the delay time T stored in the preceding delay time storage portion 1502 corresponds to the delay time T (random number 1) set for the light-emitting element array 604-2 in the (N+1)-th cycle of the line synchronizing signal as the previous line synchronizing signal. Thus, the pulse signal generation portion 1405-2 corresponding to the light-emitting element array 604-3 determines the section of lighting identical in timing to that of the light-emitting element array 604-2 due to the (N+1)-th line synchronizing signal. Note that the delay time T (random number 3) of the light-emitting element array 604-1 is sent to the pulse signal generation portion 1405-1 corresponding to the next light-emitting element array 604-2 and then is stored in the preceding delay time storage portion 1502 of the pulse signal generation portion 1405-1. The delay time T (random number 2) of the light-emitting element array 604-2 is sent to the pulse signal generation portion 1405-2 corresponding to the next light-emitting element array 604-3 and then is stored in the preceding delay time storage portion 1502 of the pulse signal generation portion 1405-2. The delay time T (random number 1) of the light-emitting element array 604-3 is sent to the pulse signal generation portion 1405-3 corresponding to the next light-emitting element array 604-4 and then is stored in the preceding delay time storage portion 1502 of the pulse signal generation portion 1405-3. Then, based on the delay time of the start timing varying between the light-emitting element arrays, each pulse signal generation portion generates a pulse signal for light emission of the corresponding light-emitting element array illustrated in FIG. 20C.

Figure 18B:
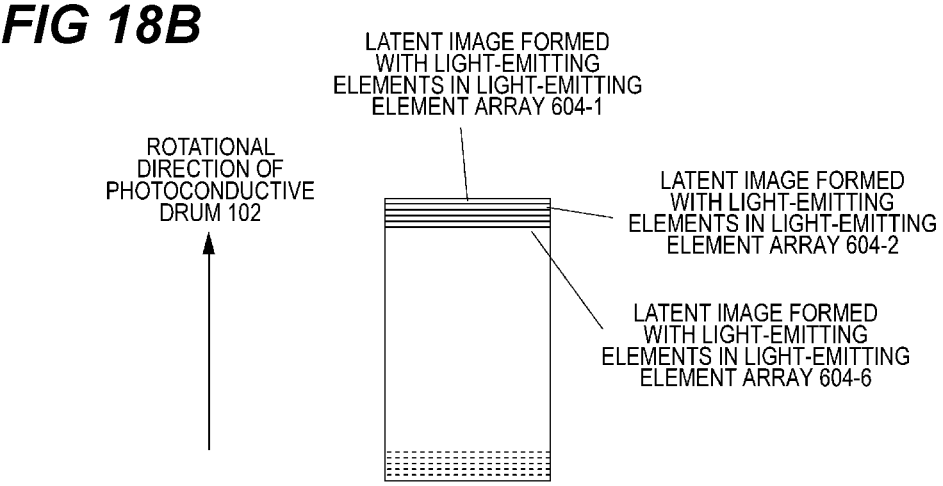

As above, changing in the start timing and termination timing of light emission between the light-emission element arrays makes respective pixels in the lines (light-emission element arrays) identical in the position of formation of a latent image in the rotational direction of the photoconductive drum 102. Specifically, as illustrated in FIG. 18B, because of the same delay time, a latent image formed with light-emitting elements in the second light-emitting element array 604-2 is identical in exposure position in the rotational direction of the drum to a latent image formed with light-emitting elements in the first light-emitting element array 604-1. Thus, multiple exposure is inhibited from blurring a latent image, so that an edgier latent image can be formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-130575, filed Aug. 10, 2021, which is hereby incorporated by reference herein in its entirety.

What is claimed is:

1. An image forming apparatus comprising:
a photoconductor;
an exposure device including a chip having a first light-emitting element array and a second light-emitting element array, the first light-emitting element array including a plurality of light-emitting elements disposed in a first direction that is parallel to a rotational axis direction of the photoconductor, the second light-emitting element array including a plurality of light-emitting elements disposed in the first direction, the first light-emitting element array and the second light-emitting element array being disposed sequentially in a second direction orthogonal to the first direction, the exposure device being configured to perform multiple exposure with the second light-emitting element array of an exposure position of the photoconductor exposed with the first light-emitting element array; and
a controller configured to transmit, to the exposure device, a signal for controlling the exposure device,
wherein the exposure device:
sets a first pulse signal for light emission of the first light-emitting element array, based on a first delay time from an input timing of a line synchronizing signal to a first start timing at which light emission starts and a first pulse width from the first start timing to a first termination timing at which the light emission terminates before a next input timing of the line synchronizing signal,
sets a second pulse signal for light emission of the second light-emitting element array, based on a second delay time, different from the first delay time, from the input timing of the line synchronizing signal to a second start timing at which light emission starts and a second pulse width, identical to the first pulse width, from the second start timing to a second termination timing at which the light emission terminates before the next input timing of the line synchronizing signal, and
starts and terminates light emission of each of the first light-emitting element array and the second light-emitting element array according to the set first pulse signal and second pulse signal.

2. The image forming apparatus according to claim 1, wherein
when the first delay time and the first pulse width as set values for the first light-emitting element array are defined, respectively, as a0 and b0 and the second delay time and the second pulse width as set values for the second light-emitting element array are defined, respectively, as a1 and b1, the following expressions are satisfied: a0≠a1, b0=b1, and a0+b0≠a1+b1.

3. The image forming apparatus according to claim 1, wherein
the exposure device includes a pulse signal generation portion configured to generate a pulse signal for light emission of a light-emitting element array, based on a delay time from an input timing of the line synchronizing signal to a start timing at which light emission starts and a pulse width from the start timing to a termination timing at which the light emission terminates, and
the pulse signal generation portion generates the first pulse signal for light emission of the first light-emitting element array, based on the first delay time from the input timing of the line synchronizing signal to the first start timing at which light emission starts and the first pulse width from the first start timing to a first termination timing at which the light emission terminates before the next input timing of the line synchronizing signal, and generates the second pulse signal for light emission of the second light-emitting element array, based on the second delay time, different from the first delay time, from the input timing of the line synchronizing signal to the second start timing at which light emission starts and the second pulse width, identical to the first pulse width, from the second start timing to a second termination timing at which the light emission terminates before the next input timing of the line synchronizing signal.

4. The image forming apparatus according to claim 1, wherein in a cycle of the line synchronizing signal in which the multiple exposure with the second light-emitting element array is performed on the exposure position exposed with the first light-emitting element array, the exposure device:

sets the second pulse signal for light emission of the second light-emitting element array based on the first delay time set for the first light-emitting element array in a previous cycle of the line synchronizing signal, and sets the first pulse signal for light emission of the first light-emitting element array based on a delay time different from the first delay time set for the first light-emitting element array in the previous cycle of the line synchronizing signal.

5. The image forming apparatus according to claim 1, wherein the exposure device includes:

a delay time generation portion configured to generate a different delay time every cycle of the line synchronizing signal; and a delay time storage portion configured to store a delay time set for a light-emitting element array, and wherein the exposure device:

sets the second pulse signal for light emission of the second light-emitting element array based on the first delay time set for the first light-emitting element array in a previous cycle of the line synchronizing signal, which is stored in the delay time storage portion, and sets the first pulse signal for light emission of the first light-emitting element array based on a delay time different from the first delay time set for the first light-emitting element array in the previous cycle of the line synchronizing signal, which is generated by the delay time generation portion.

6. The image forming apparatus according to claim 5, wherein the delay time generation portion generates a different delay time every cycle of the line synchronizing signal with a pseudorandom number.

* * * * *